US012046064B2

(12) United States Patent
Chaudhary et al.

(10) Patent No.: US 12,046,064 B2
(45) Date of Patent: Jul. 23, 2024

(54) PREDICTIVE DOCUMENT CONVERSION

(71) Applicant: Optum Technology, Inc., Eden Prairie, MN (US)

(72) Inventors: Kartik Chaudhary, Bangalore (IN); Raghav Bali, Bangalore (IN); V Kishore Ayyadevara, Hyderabad (IN); Yerraguntla Yeshwanth Reddy, Hyderabad (IN)

(73) Assignee: OPTUM TECHNOLOGY, INC., Eden Prairie, MN (US)

( * ) Notice: Subject to any disclaimer, the term of this patent is extended or adjusted under 35 U.S.C. 154(b) by 1007 days.

(21) Appl. No.: 16/999,221

(22) Filed: Aug. 21, 2020

(65) Prior Publication Data

US 2021/0326631 A1 Oct. 21, 2021

(30) Foreign Application Priority Data

Apr. 21, 2020 (IN) ............................ 202011017131

(51) Int. Cl.
*G06V 30/413* (2022.01)
*G06F 16/93* (2019.01)
(Continued)

(52) U.S. Cl.
CPC ............ *G06V 30/413* (2022.01); *G06F 16/93* (2019.01); *G06F 18/214* (2023.01); *G06N 3/04* (2013.01);
(Continued)

(58) Field of Classification Search
CPC ................ G06V 30/413; G06V 10/82; G06V 30/19173; G06V 30/10; G06F 16/93;
(Continued)

(56) References Cited

U.S. PATENT DOCUMENTS 10,163,022 B1 12/2018 Cho
10,296,817 B1 5/2019 Yang et al.
(Continued)

OTHER PUBLICATIONS

Abadi, Martin et al. "TensorFlow: Large-Scale Machine Learning on Heterogeneous Systems," arXiv:1603:04467v2, Mar. 16, 2016, (19 pages). [Retrieved from the Internet Sep. 6, 2020] <URL: https://arxiv.org/pdf/1603.04467.pdf%20http://arxiv.org/abs/1603.04467.pdf>.

(Continued)

*Primary Examiner* — Hope C Sheffield
(74) *Attorney, Agent, or Firm* — Alston & Bird LLP

(57) ABSTRACT

There is a need for more effective and efficient predictive document conversion. This need can be addressed by, for example, solutions for performing document conversion using a trained convolutional neural document conversion machine learning. In one example, the trained convolutional neural document conversion machine learning model is associated with a preprocessing block having a plurality of preprocessing subblocks, one or more main processing blocks each having a plurality of main processing subblocks, and a plurality of postprocessing subblocks each having one or more postprocessing subblocks, and the trained convolutional neural document conversion machine learning model is further associated with a preprocessing subblock repetition count hyper-parameter that defines a preprocessing subblock count of the plurality of preprocessing subblocks.

20 Claims, 17 Drawing Sheets

(51) Int. Cl.
*G06F 18/214* (2023.01)
*G06N 3/04* (2023.01)
*G06N 3/08* (2023.01)
*G06V 10/82* (2022.01)
*G06V 30/19* (2022.01)
*G06V 30/10* (2022.01)

(52) U.S. Cl.
CPC .............. *G06N 3/08* (2013.01); *G06V 10/82* (2022.01); *G06V 30/19173* (2022.01); *G06V 30/10* (2022.01)

(58) Field of Classification Search
CPC .......... G06F 18/214; G06N 3/04; G06N 3/08; G06N 3/045; G06N 3/048; G06N 3/082
See application file for complete search history.

(56) References Cited

U.S. PATENT DOCUMENTS

| | | | | |
|---|---|---|---|---|
| 2018/0137349 | A1 | 5/2018 | Such et al. | |
| 2018/0261214 | A1 | 9/2018 | Gehring et al. | |
| 2019/0087677 | A1* | 3/2019 | Wolf | G06V 30/226 |
| 2019/0180154 | A1 | 6/2019 | Orlov et al. | |
| 2019/0311227 | A1 | 10/2019 | Kriegman et al. | |
| 2020/0082196 | A1 | 3/2020 | Georgia | |
| 2021/0103798 | A1* | 4/2021 | Neagovici | G06N 3/048 |

OTHER PUBLICATIONS

Bluche, Theodore et al. "Gated Convolutional Recurrent Neural Networks For Multilingual Handwriting Recognition,". In: 2017 14th IAPR International Conference on Document Analysis and Recognition (ICDAR), vol. 1. IEEE. 2017, pp. 646-651. [Retrieved from the Internet Sep. 6, 2020] <URL: http://www.tbluche.com/files/icdar17_gnn.pdf>.

Castro, Dayvid et al. "Boosting the Deep Multidimensional Long-Short-Term Memory Network for Handwritten Recognition Systems," In 2018 16th International Conference on Frontiers in Handwriting Recognition (ICHFR), IEEE Computer Society, Aug. 2018, pp. 127-132, Los Alamitos, CA, USA. DOI: 10. 1109/ICFHR-2018.2018.00031.

Chollet, François et al. "Keras—The Python Deep Learning API," (2015), (5 pages), (article, online). [Retrieved from the Internet Sep. 6, 2020] <URL: https://keras.io>.

Collobert, Ronan Collobert et al. "Wav2Letter: An End-to-End ConvNet-Based Speech Recognition System,"In CoRR abs/1609. 03193 (2016). arXiv: 1609.03193, Sep. 13, 2016, (8 pages). [Retrieved from the Internet Sep. 6, 2020] <URL: http://arxiv.org/abs/ 1609. 03193>.

Coquenet, Denis et al. "Have Convolutions Already Made Recurrence Obsolete for Unconstrained Handwritten Text Recognition?" In 2019 International Conference on Document Analysis and Recognition Workshops (ICDARW), Sep. 22, 2019, vol. 5, pp. 65-70. IEEE. DOI: 10.1109/ICDARW.2019.40083.

Doetsch, Patrick et al. "Fast and Robust Training of Recurrent Neural Networks for Offline Handwriting Recognition," In Proceedings of International Conference on Frontiers in Handwriting Recognition, ICFHR 2014, Dec. 2014, pp. 279-284. DOI: 10.1109/ICFHR.2014.54. [Retrieved from the Internet Sep. 6, 2020] <URL: https://www-i6.informatik.rwth-aachen.de/publications/download/960/DoetschPatrickKozielskiMichalNeyHermann-Fastrobusttrainingofrecurrentneuralnetworksforofflinehwritingrecognition--2014.pdf>.

Espana-Boquera, Salvador et al. "Improving Offline Handwritten Text Recognition With Hybrid HMM/ANN Models," In IEEE Transactions On Pattern Analysis and Machine Intelligence, vol. 33, No. 4, Apr. 2011, pp. 767-779. [Retrieved from the Internet Sep. 6, 2020] <URL: https://www.researchgate.net/profile/Maria_Jose_Castro-Bleda/publication/45660308_Improving_Offline_Handwritten_Text_Recognition_with_Hybrid_HMMANN_Models/.

Gao, Yunze et al. "Reading Scene Text With Fully Convolutional Sequence Modeling," Neurocomputing, vol. 339, Apr. 28, 2019, pp. 161-170. arXiv:1709.04303v1 [cs,CV], Sep. 13, 2017.

Graves, Alex et al. "A Novel Connectionist System For Unconstrained Handwriting Recognition," In IEEE Transactions On Pattern Analysis and Machine Intelligence, vol. 31, No. 5, (2008), pp. 855-868. [Retrieved from the Internet Sep. 6, 2020\ <URL: https://mediatum.ub.tum.de/doc/1289308/file.pdf>.

Graves, Alex et al. "Connectionist Temporal Classification: Labelling Unsegmented Sequence Data With Recurrent Neural Networks," In Proceedings of the 23rd International Conference On Machine Learning, Jun. 25, 2006, pp. 369-376. [Retrieved from the Internet Sep. 6, 2020] <URL: https://mediatum.ub.tum.de/doc/1292048/file.pdf>.

Graves, Alex et al. "Offline Handwriting Recognition With Multidimensional Recurrent Neural Networks," In Advances In Neural Information Processing Systems, (2009), pp. 545-552. [Retrieved from the Internet Sep. 6, 2020] <URL: https://papers.nips.cc/paper/3449-offline-handwriting-recognition-with-multidimensional-recurrent-neural-networks.pdf>.

Graves, Alex. "Generating Sequences With Recurrent Neural Networks," arXiv: 1308.0850 [cs.NE], Jun. 5, 2014, pp. 1-43. [Retrieved from the Internet Sep. 6, 2020] <URL: http://citeseerx.ist.psu.edu/viewdoc/download;jsessionid=DD23CDA0D6D5D35BAE406EAD612A548D?doi=10.1.1.764.1789&rep=rep1&type=pdf>.

Huang Gao et al. "Densely Connected Convolutional Networks," In Proceedings of the IEEE Conference On Computer Vision and Pattern Recognition, (2017), pp. 4700-4708. [Retrieved from the Internet Sep. 6, 2020] <URL: https://openaccess.thecvf.com/content_cvpr_2017/papers/Huang_Densely_Connected_Convolutional_CVPR_2017_paper.pdf>.

Ingle, R. Reeve et al. "A Scalable Handwritten Text Recognition System," In arXiv preprint arXiv: 1904.09150, Jun. 14, 2019, (8 pages). [Retrieved from the Internet Sep. 6, 2020] <URL: https://arxiv.org/pdf/1904.09150.pdf>.

Jaderberg, Max et al. "Deep Structured Output Learning For Unconstrained Text Recognition," In arXiv preprint arXiv:1412.5903v5 [cs.CV], Apr. 10, 2015, pp. 1-10. [Retrieved from the Internet Sep. 6, 2020] <URL: https://arxiv.org/pdf/1412.5903.pdf].

Jaderberg, Max Jaderberg. "Synthetic Data and Artificial Neural Networks for Natural Scene Text Recognition," arXiv: 1406.2227v4 [cs.CV], Dec. 9, 2014, pp. 1-10. [Retrieved from the Internet Sep. 6, 2020] <URL: https://arxiv.org/pdf/1406.2227.pdf>.

Jung, Alexander B. "imgaug," (25 pages), (article, online). [Retrieved from the Internet Sep. 6, 2020] <URL: https://github.com/aleju/imgaug>.

Lee, Chen-Yu et al. "Recursive Recurrent Nets With Attention Modeling For OCR In The Wild," In Proceedings of the IEEE Conference on Computer Vision and Pattern Recognition 2016 (pp. 2231-2239). [Retrieved from the Internet Sep. 6, 2020] <URL: https://openaccess.thecvf.com/content_cvpr_2016/papers/Lee_Recursive_Recurrent_Nets_CVPR_2016_paper.pdf>.

Li, Hongzhu et al. "A Novel Re-Weighting Method For Connectionist Temporal Classification," Ground AI, Apr. 24, 2019, (20 pages). [Retrieved from the Internet Sep. 6, 2020] <URL: https://www.groundai.com/project/a-novel-re-weighting-method-for-connectionist-temporal-classification/1>.

Li, Hongzhu Li et al. "Reinterpreting CTC Training As Iterative Fitting," In arXiv preprint arXiv:1904.10619v2 [cs.CV], Jul. 7, 2020, (23 pages).

Li, Jason et al. "Jasper: An End-to-End Convolutional Neural Acoustic Model," arXiv preprint arXiv:1904.03288, Aug. 27, 2019, (5 pages).

Marti, Urs-Viktor et al. "The IAM-Database: An English Sentence Database For Offline Handwriting Recognition," In International Journal on Document Analysis and Recognition, vol. 5, pp. 39-46, Nov. 2002.

(56) References Cited

OTHER PUBLICATIONS

Mishra, Anand et al. "Scene Text Recognition using Higher Order Language Priors," In BMVC—British Machine Vision Conference, Sep. 2012, pp. 1-11, Surrey, United Kingdom. DOI: 10.5244/c.26.127.

Pham, Vu et al. "Dropout Improves Recurrent Neural Networks For Handwriting Recognition," arXiv:1312.4569v2 [cs.CV], Mar. 10, 2014, (6 pages). [Retrieved from the Internet Sep. 6, 2020] <URL: https://arxiv.org/pdf/1312.4569.pdf>.

Poznanski, Arik et al. "CNN-N-Gram for Handwriting Word Recognition," In Proceedings of the IEEE Conference On Computer Vision and Pattern Recognition, (2016), pp. 2305-2314. DOI: 10.1109/CVPR.2016.253.

Pratap, Vineel et al. "Wav2Letter++: The Fastest Open-source Speech Recognition System," arXiv: 1812.07625v1 [cs.CL], Dec. 18, 2018, (5 pages). [Retrieved from the Internet Sep. 6, 2020] <URL: http://arxiv.org/abs/1812.07625>.

Sheng, F. et al. "Nrtr: A No. Recurrence Sequence-to-Sequence Model For Scene Text Recognition," In 2019 International Conference on Document Analysis and Recognition (ICDAR), Sep. 20, 2019, pp. 781-786. IEEE. arXiv:1806.00926v2 [cs.CV], Oct. 10, 2019.

Shi, Baoguang et al. "An End-to-End Trainable Neural Network for Image-Based Sequence Recognition and Its Application to Scene Text Recognition," arXiv:1507.05717v1 [cs.CV], Jul. 21, 2015, (9 pages). [Retrieved from the Internet Sep. 6, 2020] <URL: https://arxiv.org/pdf/1507.05717.pdf>.

Smith, Ray. "An Overview of the Tesseract OCR Engine," In Ninth International Conference on Document Analysis and Recognition (ICDAR 2007), Sep. 23, 2007, vol. 2., pp. 629-633. IEEE.

Tang, Jian et al. "Acoustic Modeling With Densely Connected Residual Network For Multichannel Speech Recognition," Interspeech 2018, Sep. 2-6, 2018, pp. 1783-1787, Hyderabad, India. [Retrieved from the Internet Sep. 6, 2020] <URL: https://kar.kent.ac.uk/67452/1/template_v10.pdf>.

Voigtlaender, Paul et al. "Handwriting Recognition With Large Multidimensional Long Short-Term Memory Recurrent Neural Networks," In 2016 15th International Conference on Frontiers in Handwriting Recognition (ICFHR), Oct. 23, 2016, pp. 228-233. IEEE.

Wang, Jianfeng et al. "Gated Recurrent Convolution Neural Network for OCR," In Advances in Neural Information Processing Systems, (2017), pp. 335-344.

Wang, Kai et al. "End-to-End Scene Text Recognition," In 2011 International Conference on Computer Vision, Nov. 6, 2011, pp. 1457-1464. IEEE.

Yang, Lu et al. "A Simple and Strong Convolutional-Attention Network For Irregular Text Recognition," arXiv:1904.01375v3 [cs.CV], Aug. 28, 2019, (23 pages).

Yin, Fei et al. "Scene Text Recognition With Sliding Convolutional Character Models," arXiv preprint arXiv:1709.01727, Sep. 6, 2017, (10 pages).

Yousef, Mohamed et al. "Accurate Data-Efficient Unconstrained Text Recognition With Convolutional Neural Networks," Journal of Latex Class Files, vol. 14, No. 8, Aug. 2015. arXiv:1812.11894v1 [cs.CV], Dec. 31, 2018, (13 pages).

Zhou, Xinyu et al. "EAST: An Efficient and Accurate Scene Text Detector," In Proceedings of the IEEE Conference On Computer Vision and Pattern Recognition, (2017), pp. 5551-5560.

* cited by examiner

| Block # | # of Sub-Blocks | Kernel | # of Filters | Dropout | Dilation | Stride |
|---|---|---|---|---|---|---|
| Preprocess-I | 2 | 3 | 64 | 0.2 | 1 | 2 |
| B1 | 3 | 3 | 128 | 0.2 | 1 | 1 |
| B2 | 3 | 4 | 128 | 0.3 | 1 | 1 |
| B3 | 3 | 6 | 128 | 0.3 | 1 | 1 |
| Postprocess-I | 1 | 7 | 256 | 0.4 | 2 | 1 |
| Postprocess-II | 1 | 1 | 512 | 0.4 | 1 | 1 |
| Postprocess-III | 1 | 1 | \|Vocab\| | 0 | 1 | 1 |

FIG. 7

FIG. 14
1301
Ashley Garden
ts68v@verizon.net
Lane Well
$ 158.03
5919 Trussville Crossings Pkwy, Birmingham A

PREDICTIVE DOCUMENT CONVERSION

CROSS-REFERENCE TO RELATED PATENT APPLICATIONS

The present patent application claims priority to Indian Provisional Patent Application No. 202011017131 (filed on Apr. 21, 2020), which is incorporated herein by reference in its entirety.

BACKGROUND

Various embodiments of the present invention address technical challenges related to performing conversion of a document image into character form (e.g., performing at least one of optical character recognition (OCR), handwritten text recognition (HTR), and optical mark recognition (OMR)). Various embodiments of the present invention address the shortcomings of existing document character-level conversion systems and disclose various techniques for efficiently and reliably performing character-level conversion of a document image.

BRIEF SUMMARY

In general, embodiments of the present invention provide methods, apparatus, systems, computing devices, computing entities, and/or the like for performing conversion of a document image into character form. Certain embodiments of the present invention utilize systems, methods, and computer program products that perform conversion of a document image into character form by using at least one of trained convolutional neural document conversion machine learning models, synthetically generated machine printed text data, synthetically generated handwritten text data, dynamic affixation of text data objects and checkbox markings, weighted connectionist temporal classification decoding, and greedy decoding instead of utilizing a language model.

In accordance with one aspect, a method is provided. In one embodiment, the method comprises: identifying an input document object; processing the input document object using a trained convolutional neural document conversion machine learning model to generate a converted document object, wherein: (i) the trained convolutional neural document conversion machine learning model is configured to map the input document object to an ordered character combination; (ii) the ordered character combination is determined based on a set of candidate characters; (iii) the set of candidate characters include a set of alphanumeric characters and a set of selection indicator characters; (iv) the trained convolutional neural document conversion machine learning model is associated with a preprocessing block having a plurality of preprocessing subblocks, one or more main processing blocks each having a plurality of main processing subblocks, and a plurality of postprocessing subblocks each having one or more postprocessing subblocks; and (v) the trained convolutional neural document conversion machine learning model is associated with a preprocessing subblock repetition count hyper-parameter that defines a preprocessing subblock count of the plurality of preprocessing subblocks; and performing one or more prediction-based actions based on the converted document object.

In accordance with another aspect, a computer program product is provided. The computer program product may comprise at least one computer-readable storage medium having computer-readable program code portions stored therein, the computer-readable program code portions comprising executable portions configured to: identify an input document object; process the input document object using a trained convolutional neural document conversion machine learning model to generate a converted document object, wherein: (i) the trained convolutional neural document conversion machine learning model is configured to map the input document object to an ordered character combination; (ii) the ordered character combination is determined based on a set of candidate characters; (iii) the set of candidate characters include a set of alphanumeric characters and a set of selection indicator characters; (iv) the trained convolutional neural document conversion machine learning model is associated with a preprocessing block having a plurality of preprocessing subblocks, one or more main processing blocks each having a plurality of main processing subblocks, and a plurality of postprocessing subblocks each having one or more postprocessing subblocks; and (v) the trained convolutional neural document conversion machine learning model is associated with a preprocessing subblock repetition count hyper-parameter that defines a preprocessing subblock count of the plurality of preprocessing subblocks; and perform one or more prediction-based actions based on the converted document object.

In accordance with yet another aspect, an apparatus comprising at least one processor and at least one memory including computer program code is provided. In one embodiment, the at least one memory and the computer program code may be configured to, with the processor, cause the apparatus to: identify an input document object; process the input document object using a trained convolutional neural document conversion machine learning model to generate a converted document object, wherein: (i) the trained convolutional neural document conversion machine learning model is configured to map the input document object to an ordered character combination; (ii) the ordered character combination is determined based on a set of candidate characters; (iii) the set of candidate characters include a set of alphanumeric characters and a set of selection indicator characters; (iv) the trained convolutional neural document conversion machine learning model is associated with a preprocessing block having a plurality of preprocessing subblocks, one or more main processing blocks each having a plurality of main processing subblocks, and a plurality of postprocessing subblocks each having one or more postprocessing subblocks; and (v) the trained convolutional neural document conversion machine learning model is associated with a preprocessing subblock repetition count hyper-parameter that defines a preprocessing subblock count of the plurality of preprocessing subblocks; and perform one or more prediction-based actions based on the converted document object.

BRIEF DESCRIPTION OF THE DRAWINGS

Figure 1:
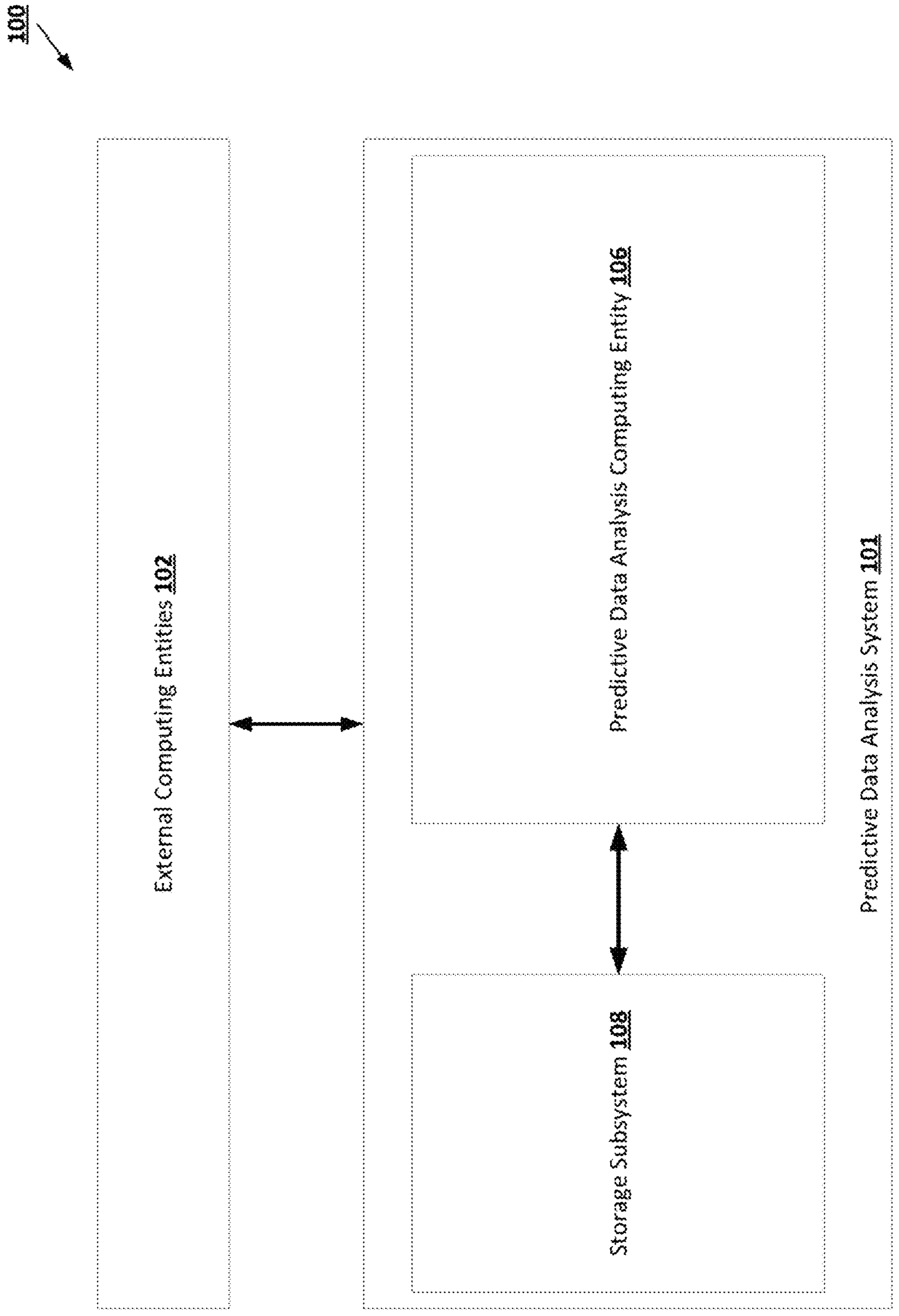

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
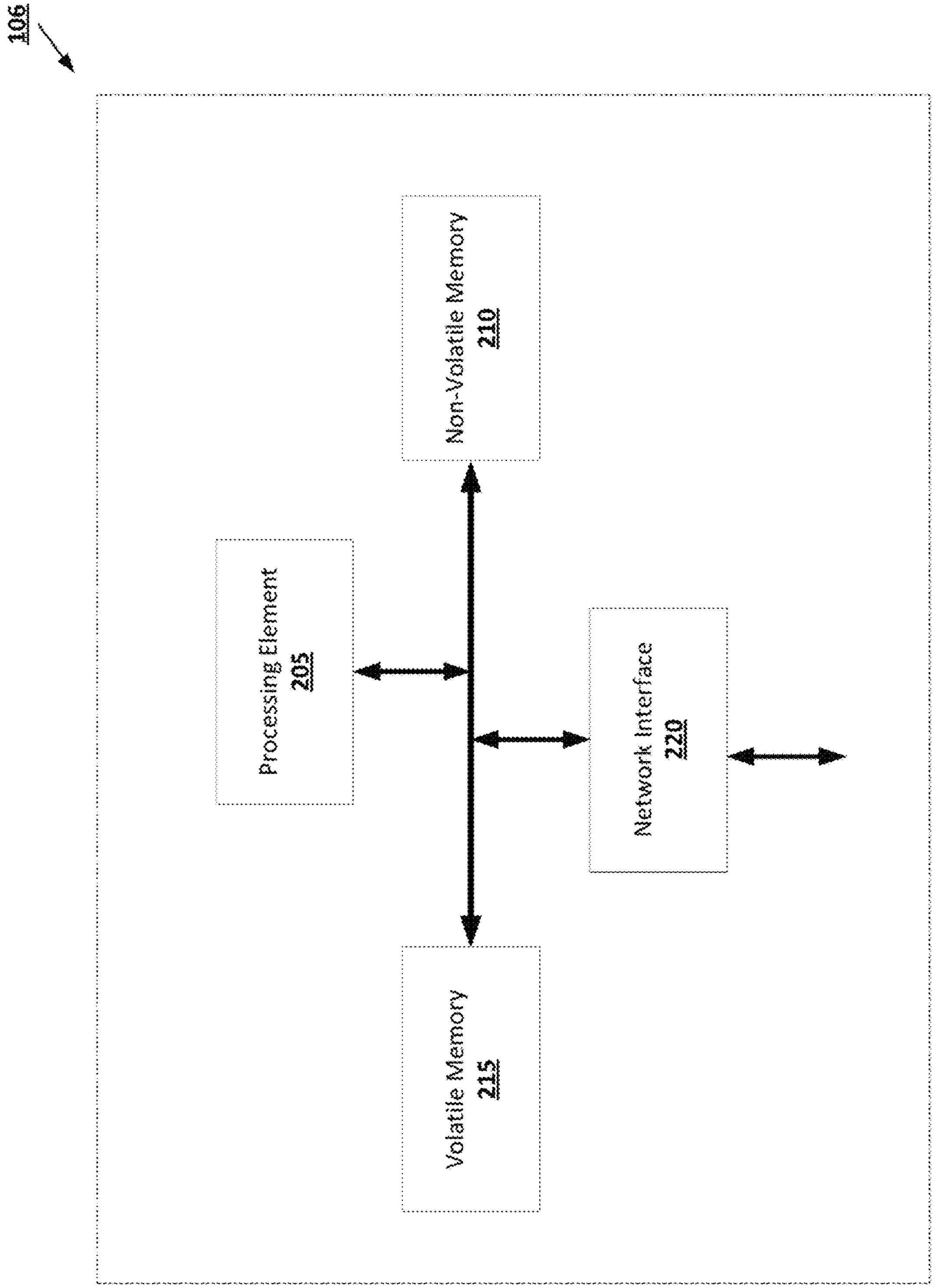

FIG. 2 provides an example predictive data analysis computing entity in accordance with some embodiments discussed herein.

Figure 3:
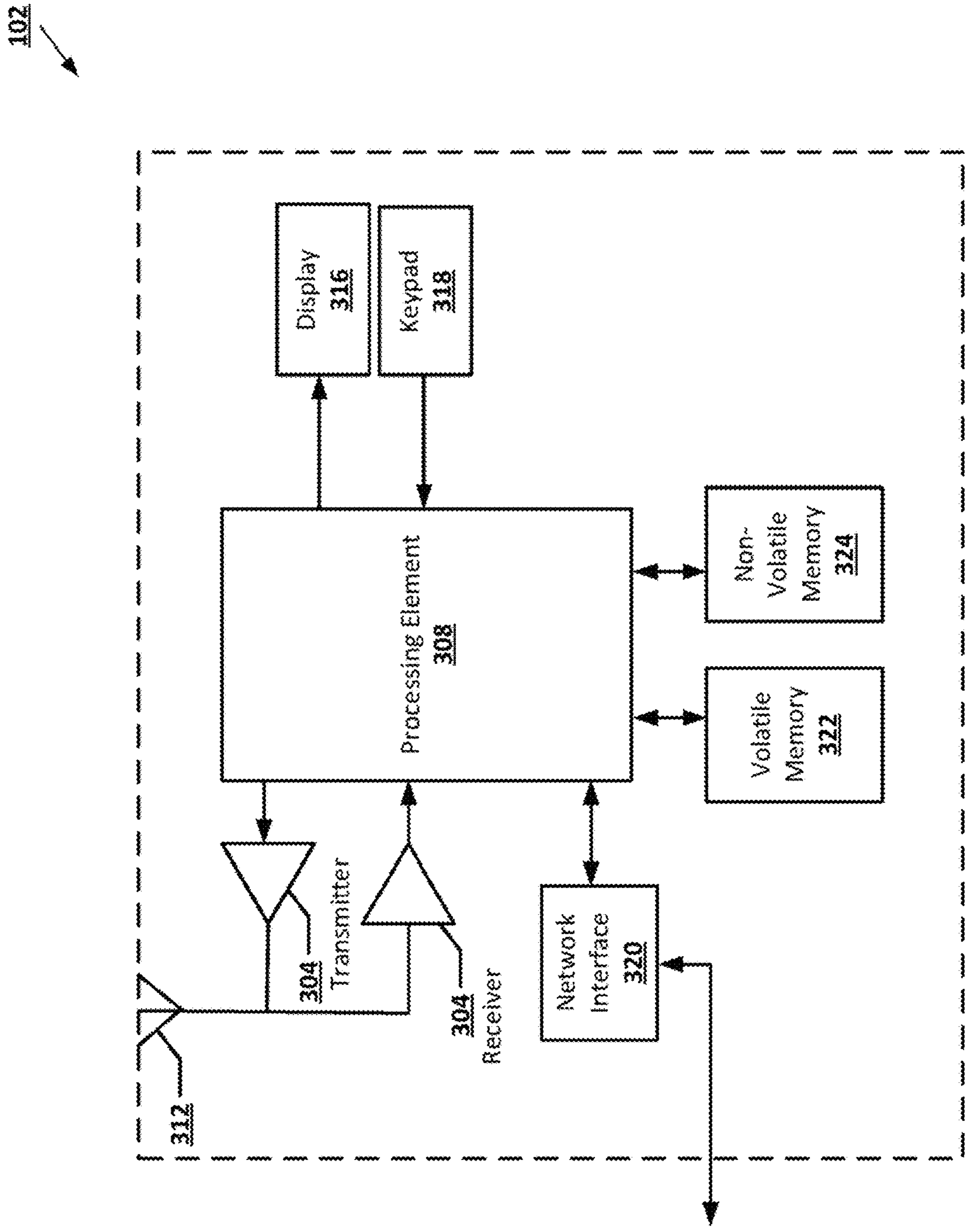

FIG. 3 provides an example external computing entity in accordance with some embodiments discussed herein.

Figure 4:
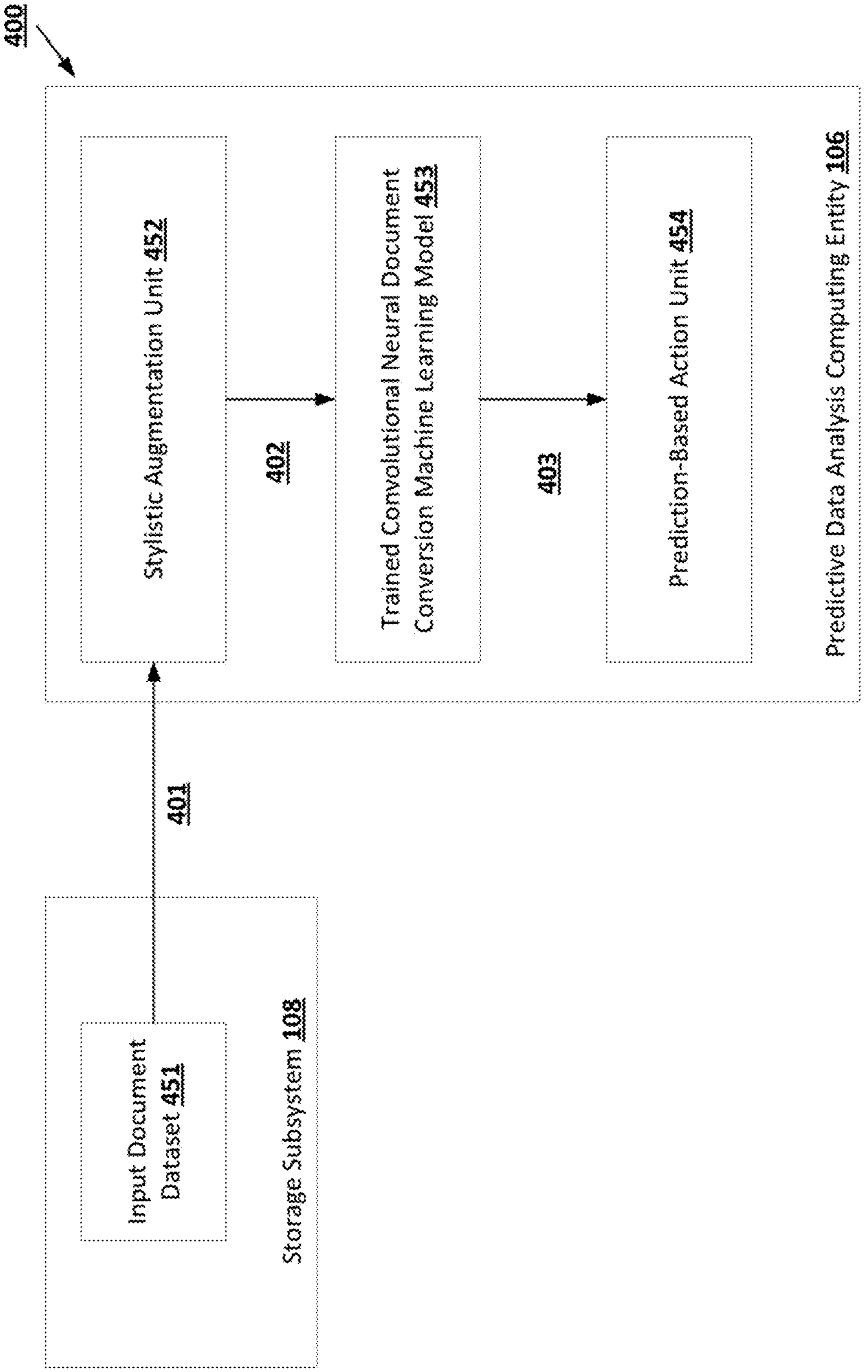

FIG. 4 is a data flow diagram of an example process for performing predictive document conversion in accordance with some embodiments discussed herein.

Figure 5:
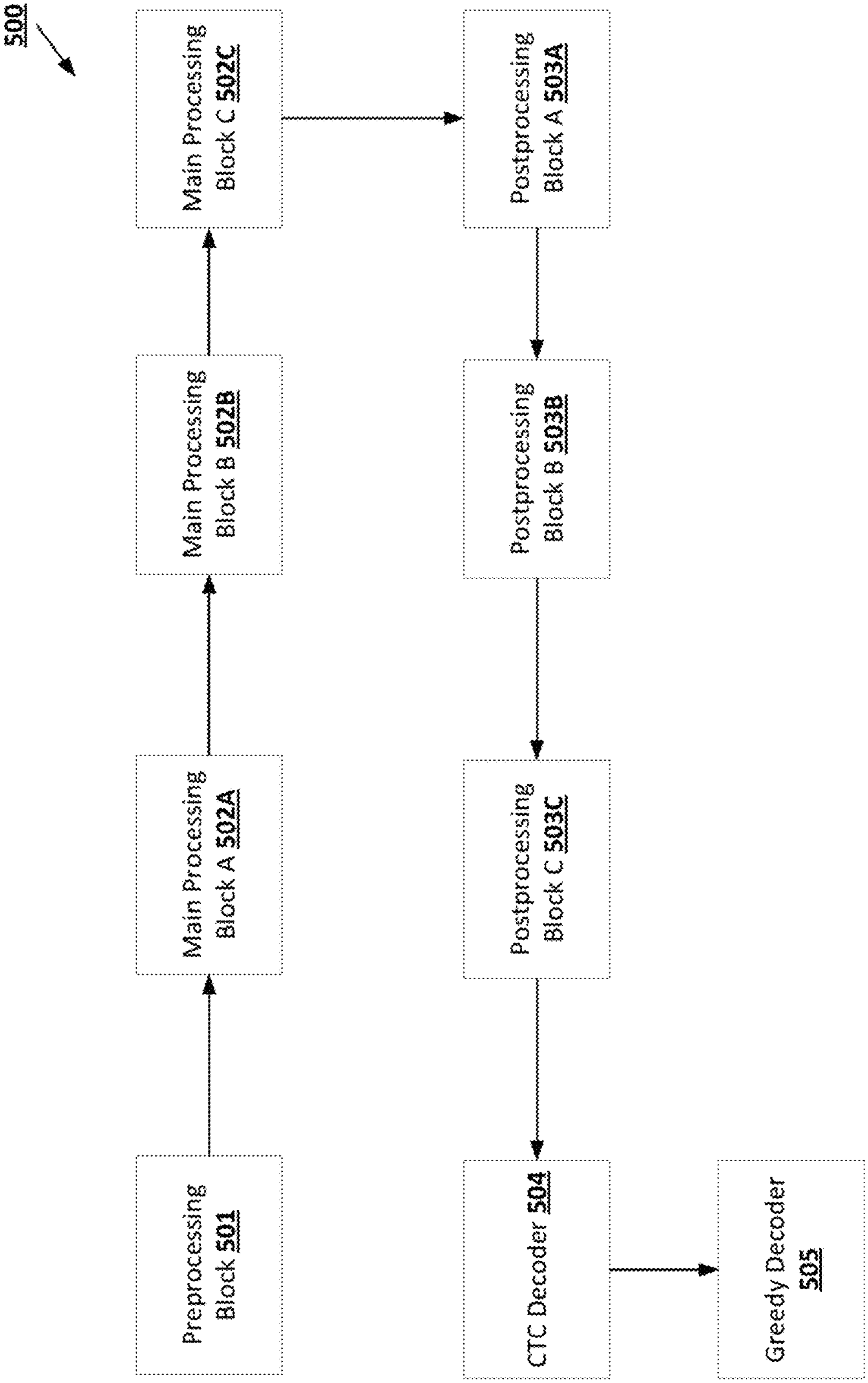

FIG. 5 provides an operational example of a trained convolutional neural document conversion machine learning model in accordance with some embodiments discussed herein.

Figure 6:
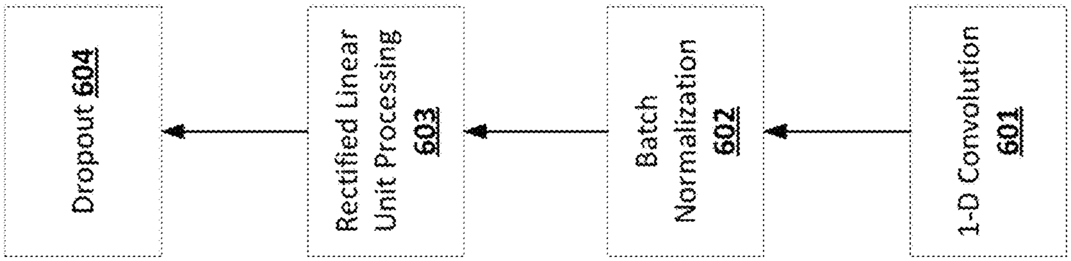

FIG. 6 provides an operational example of a convolutional processing block of a trained convolutional neural document conversion machine learning model in accordance with some embodiments discussed herein.

FIG. 7 provides an operational example of hyper-parameters of a trained convolutional neural document conversion machine learning model in accordance with some embodiments discussed herein.

Figure 8:
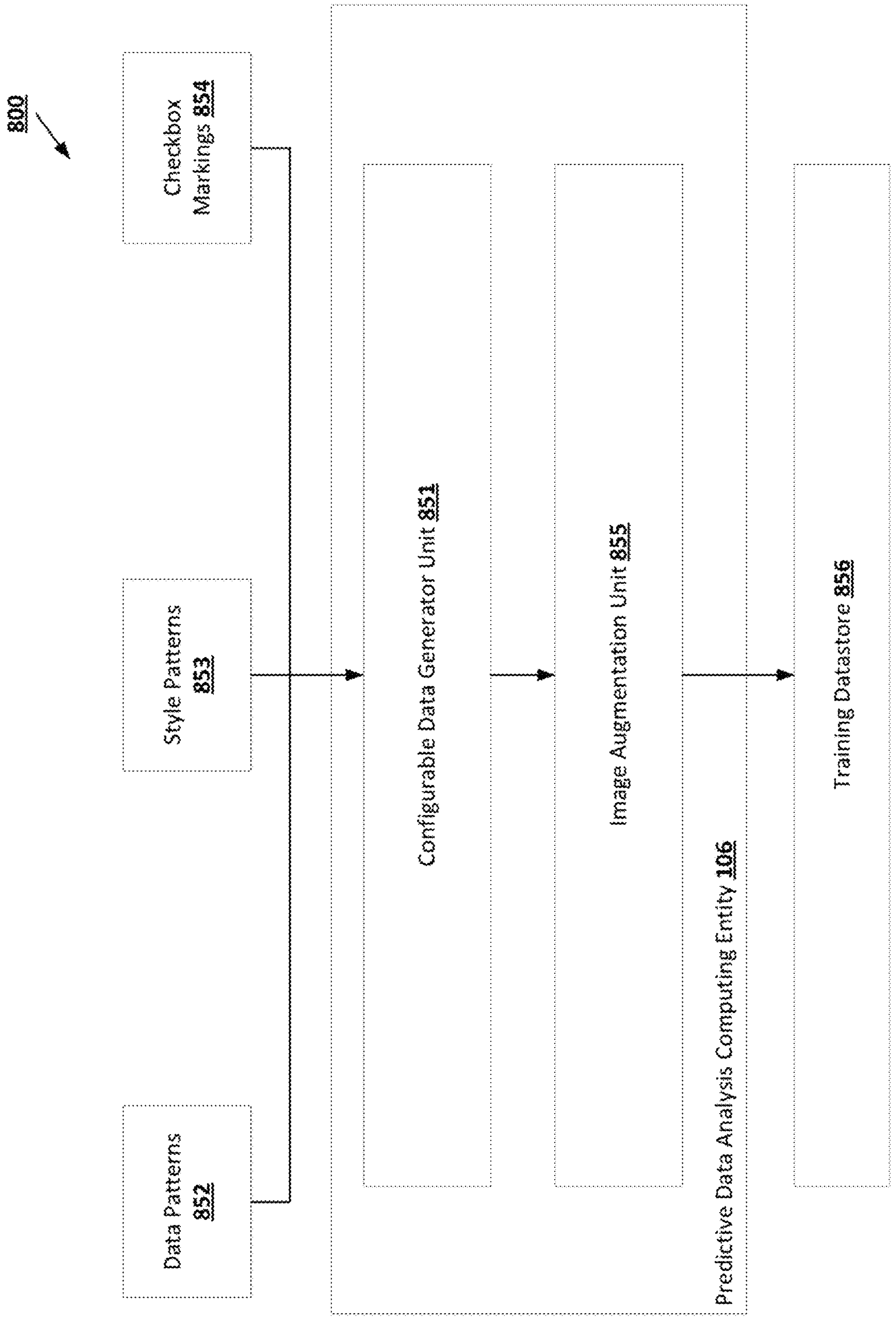

FIG. 8 is a data flow diagram of an example process for generating training data for training a convolutional neural document conversion machine learning model in accordance with some embodiments discussed herein.

Figure 9:
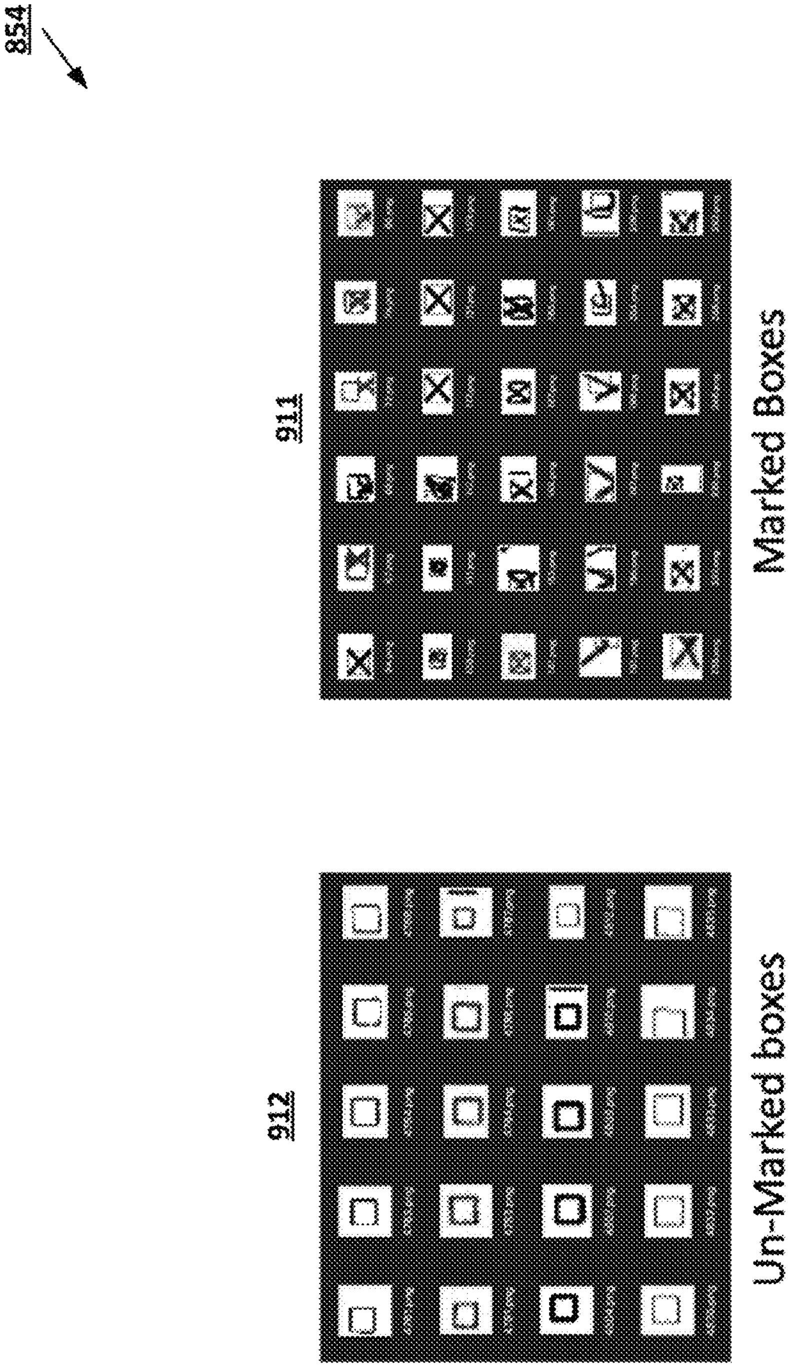

FIG. 9 provides an operational example of a repository of checkbox images in accordance with some embodiments discussed herein.

Figure 10:
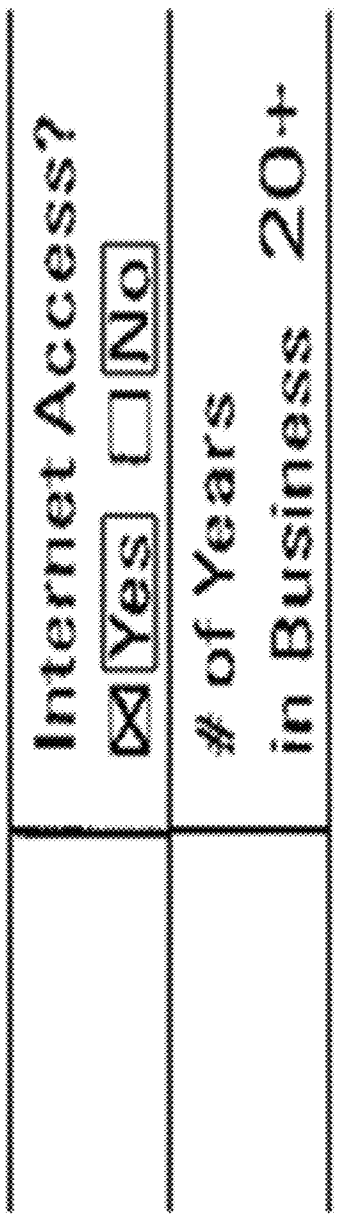

FIG. 10 provides an operational example of identifying a checkbox-related text segment in accordance with some embodiments discussed herein.

Figure 11:
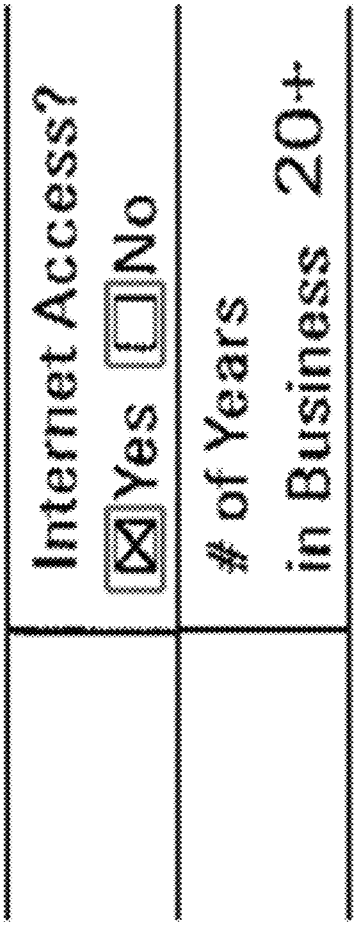

FIG. 11 provides an operational example of cropping an estimated checkbox portion of a document image in accordance with some embodiments discussed herein.

Figure 12:
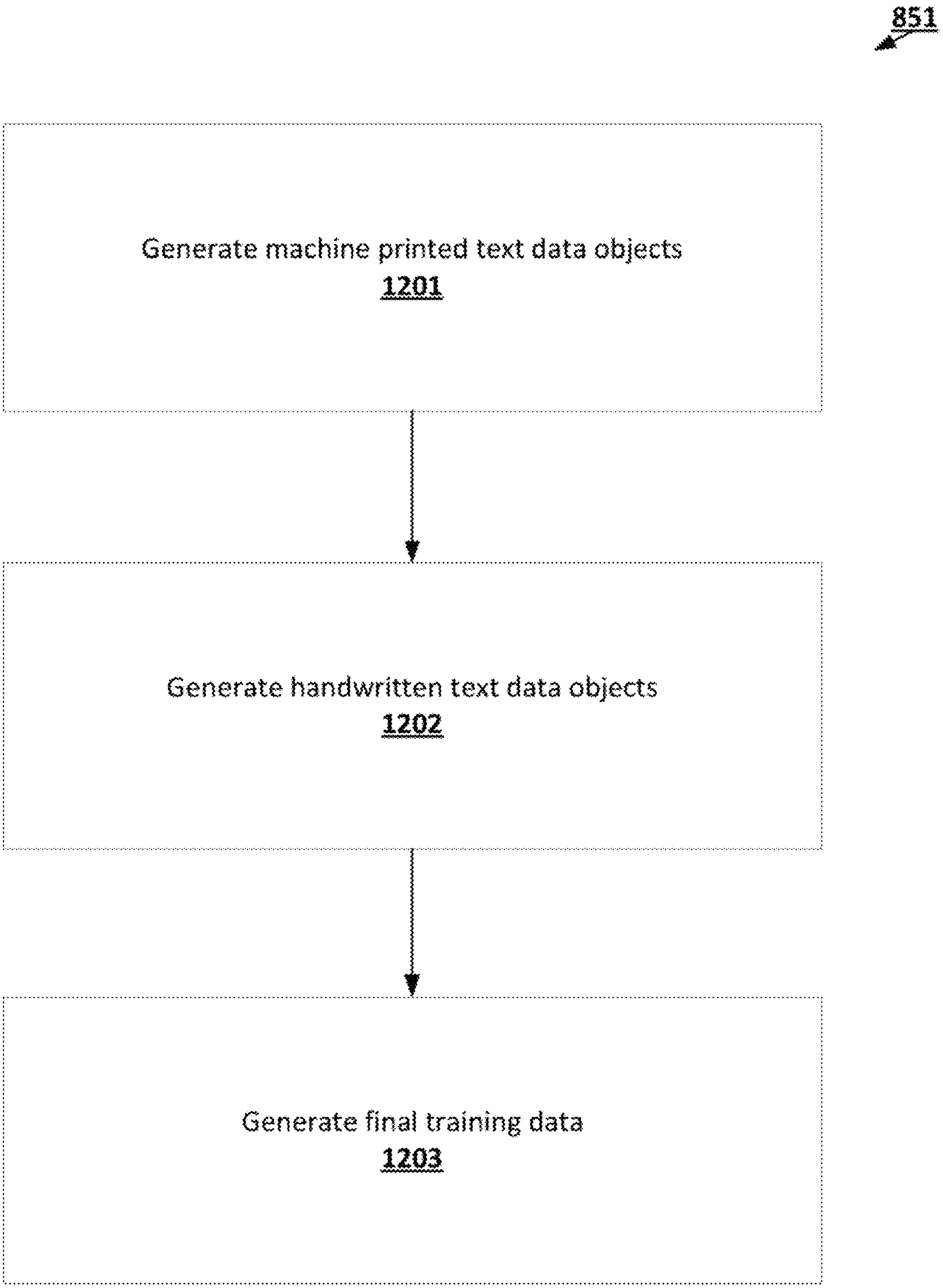

FIG. 12 is a flowchart diagram of an example process for generating training data for training a convolutional neural document conversion machine learning model by using a set of text patterns, a set of style patterns, and a set of checkbox markings in accordance with some embodiments discussed herein.

Figure 13:
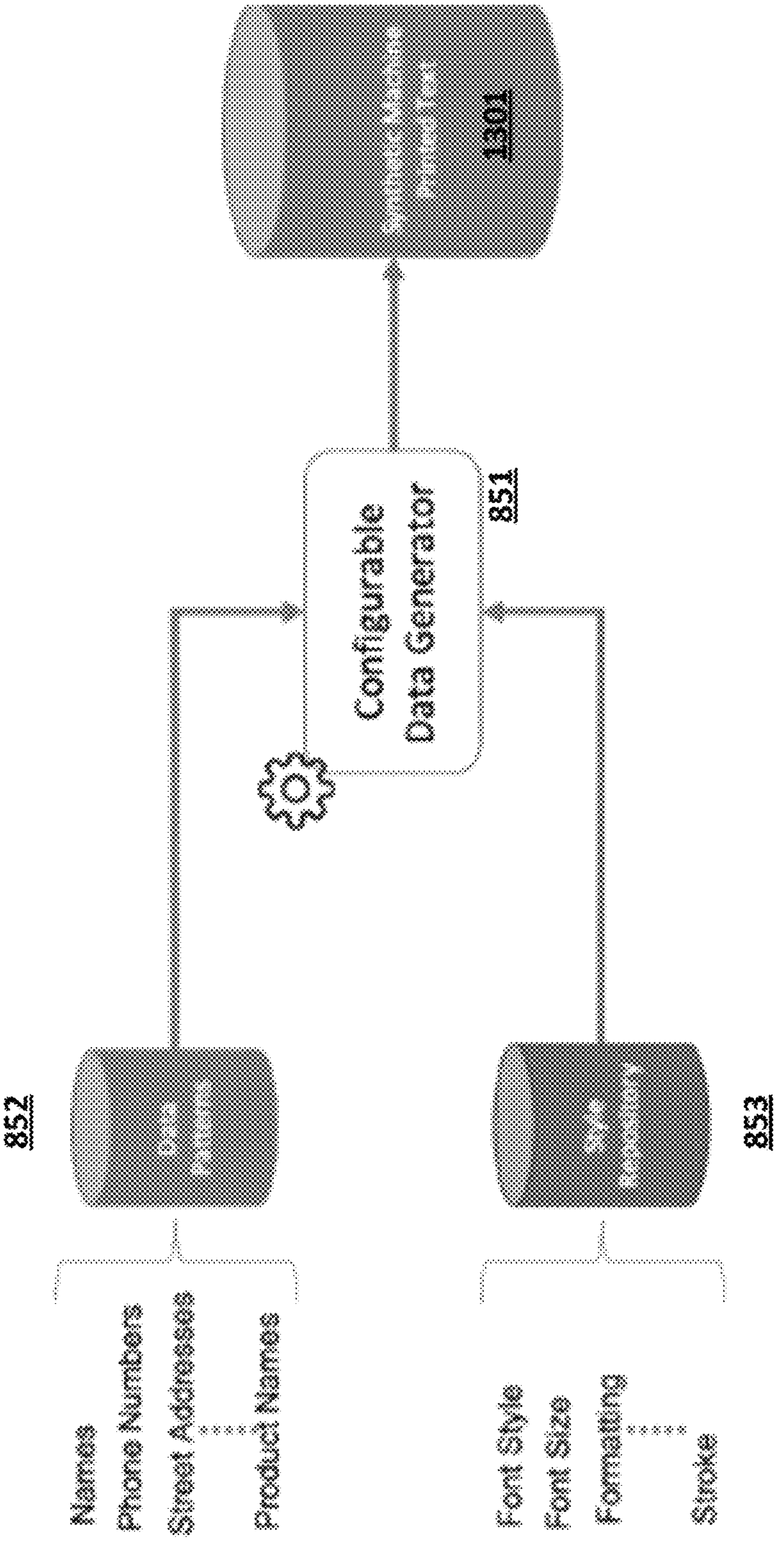

FIG. 13 provides an operational example of generating synthetically generated machine printed text data objects in accordance with some embodiments discussed herein.

Figure 14:

FIG. 14 provides an operational example of a group of synthetically generated machine printed text data objects in accordance with some embodiments discussed herein.

Figure 15:
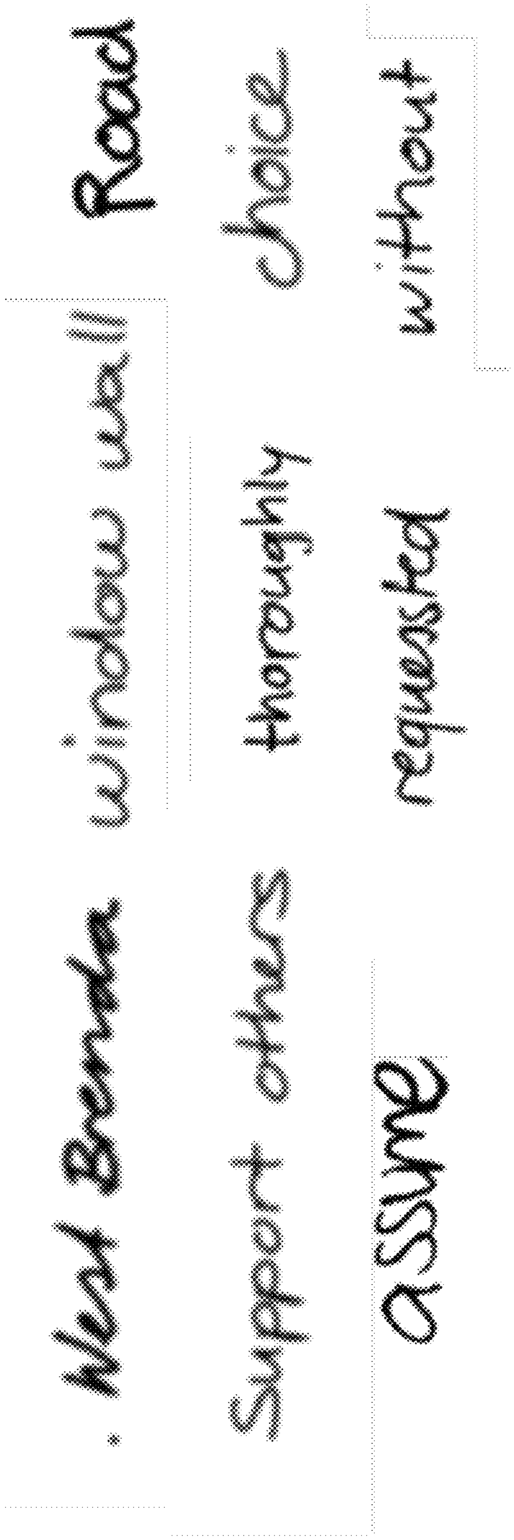

FIG. 15 provides an operational example of a group of synthetically generated handwritten text data objects in accordance with some embodiments discussed herein.

Figure 16A:
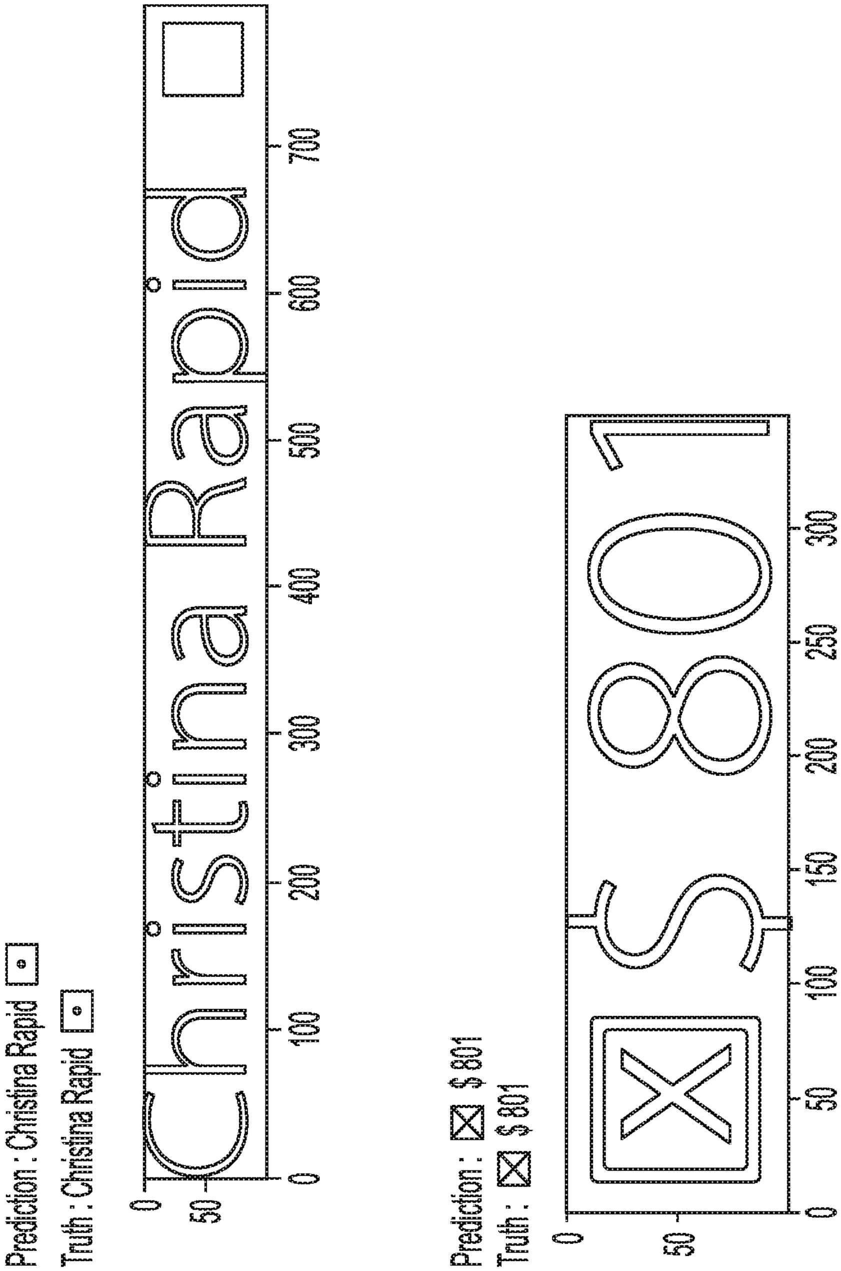
Figure 16B:
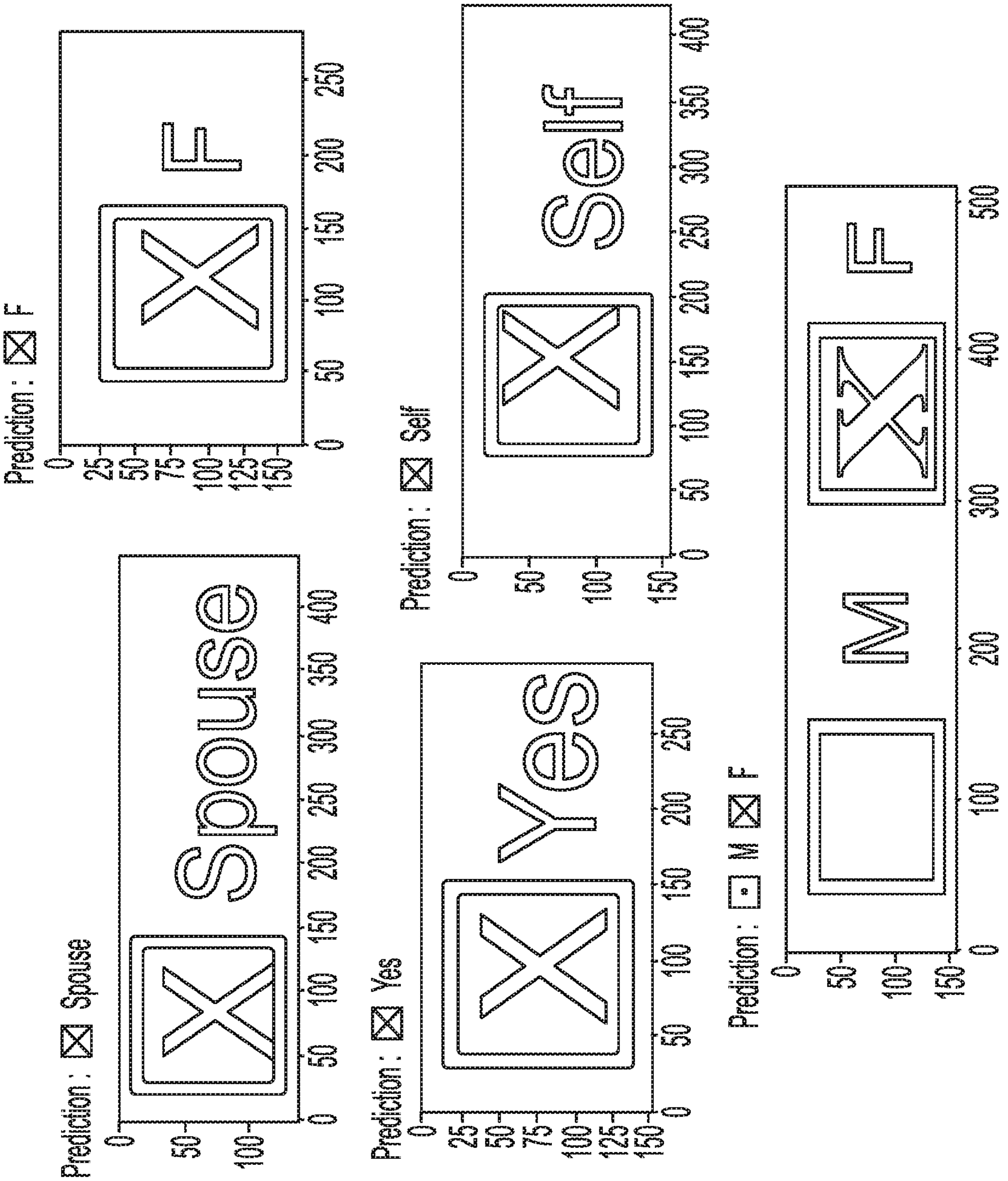

FIGS. 16A and 16 B provide operational examples of various OCR/HTR/OMR output user interface components in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW

Various embodiments of the present invention present innovative solutions for performing OCR/HTR/OMR that improve the computational efficiency and operational reliability of existing OCR/HTR/OMR models. Through their investigations, the inventors have recognized at least two sources contributing to the limited computational efficiency and the limited operational reliability of existing OCR/HTR/OMR models: limited availability of training data and computationally expensive use of language models. The innovative solutions provided herein include OCR/HTR/OMR models that are trained using synthetically generated training data as well as greedy decoding to obviate the need for language models.

Limited availability of training data is a major problem for OCR solutions, HTR solutions, OMR solutions, and any solutions utilizing a combination of at least two of OCR, HTR, and OMR. Manual generation of labeled training data that may be used to train deep learning models used for OCR/HTR/OMR is resource-intensive and largely impractical for more complex models, while using unlabeled training routines has led to ineffective deep learning models that are unable to reliably perform OCR/HTR/OMR. In response, aspects of some embodiments of the present invention disclose innovative solutions for performing OCR/HTR/OMR that utilize models trained using synthetically generated machine printed text data objects, synthetically generated handwritten text data objects, as well as text images generated by affixing text data objects (including synthetically generated text data objects) to checkbox markings using a randomized process. By utilizing the noted innovative techniques, various embodiments of the present invention enable more effective training of OCR/HTR/OMR models, which in turn improves the reliability of performing OCR/HTR/OMR using deep learning models.

In addition, the inventors have discovered that using language models is a major bottleneck for efficient training of OCR/HTR/OMR models. As the inventors have discovered, this may be for one of at least two reasons: Firstly, training a language model requires additional time and data volume which is not always available. Secondly, the usage of language model slows down the inference pipeline in practice. To overcome the obstacles imposed by the use of language models in training OCR/HTR/OMR models, various embodiments of the present invention disclose using greedy decoding instead of language models to train deep learning models. By utilizing the noted innovative techniques, various embodiments of the present invention enable more efficient training of OCR/HTR/OMR models, which in turn improves the efficiency of performing OCR/HTR/OMR using deep learning models.

Text is a ubiquitous entity in natural images and most real world datasets like scanned documents, restaurant menu cards, receipts, tax forms, license plates, etc. These datasets may contain text in both, printed as well as handwritten formats. Extracting text information from such datasets is a complex task due to variety of writing styles and more so due to limitation of ground truth. Handwritten Text Recognition or HTR is an even more involved process with countless variation of styles. For example, United Health Group/Optum uses different types of offline forms to handle prescriptions, enrolments, renewals and so on. Being one of the largest healthcare providers, the number of such forms processed runs into millions. Such forms consist of text, numeric and checkbox fields placed in different templates for different processes/applications. These forms are processed either manually or using OCR+OMR pipelines to extract information. Processes using OCR pipelines have to train and deploy OMR solutions to handle checkbox fields separately. This additional component increases overall complexity, cost, and effort required to maintain such pipelines.

OCR systems have been in existence for quite some time now. Some existing OCR systems present traditional computer graphics and machine learning based approaches to handle tasks of OCR and HTR. There are a number of open-source OCR engines, Tesseract being one of them. However, Known OCR solutions like Microsoft Azure Vision API, Google Vision API do not handle OMR task without additional OMR model in the pipeline. Currently known OMR solutions use object detection techniques to first locate a checkbox and another model (A deep learning model in most cases) to check whether it is marked or not. This method increases latency, complexity and overall cost of the solution. Object detection based checkbox detection models potentially fail to detect checkboxes if the box is distorted. Some known OMR solutions require prior knowledge about checkbox field names or locations. Moreover, one downside of many deep-learning-based OCR solutions is their dependence on huge amounts of data and compute. These requirements render them difficult, if not infeasible, for training and deployment.

Aspects of the present invention relate to utilizing one-dimensional convolutions only for the task of offline handwriting recognition without any recurrence. To handle a variety of styles and generalize well, we performed multiple augmentations to the samples from offline IAM dataset along with image degradation manipulations to synthetically generated data points. Efficient And Scalable Text Recognizer (or EASTER henceforth) being a simple architecture, outperforms more complex models in terms of training time, volume of training data and performance (word and character error rates). EASTER handles both handwritten and machine printed texts. Being fully convolutional (using only one-dimensional convolutions) enables development of smaller, faster and parallel trainable models. This further reduces the barrier for deployment and scalability.

OCR models typically work by analyzing an input image and generating corresponding characters and numbers as outputs. For an OCR solution trained for English vocabulary, there are 62 characters typically (26 lower case characters, 26 upper case characters and 10 digits). The EASTER OCR model adds on to this list of characters recognized by the OCR model by considering checkboxes as two different characters of English language (marked checkbox is one character while unmarked checkbox is another). The proposed solutions then retrain this OCR model with two extra characters. The resulting OCR model is able to transcribe full image into text along with checkboxes without requiring any additional input information or a different model for checkboxes. The proposed model mitigates the requirement of a separate OMR pipeline entirely.

In some embodiments, EASTER follows a block approach where-in each block consists of multiple repeating sub-blocks. Each sub-block comprises of a one-dimensional convolutional layer with multiple filters followed by layers for normalization, rectified linear unit, and dropout. Some aspects of EASTER utilize padding to maintain the dimensions of the input slice. Each EASTER architecture may have one preprocessing block and three postprocessing blocks. The pre and post processing blocks also follow similar block structure. Moreover, the Connectionist Temporal Classification (CTC) method is used to train as well as infer results from the proposed model. The characters (or vocabulary for our task of OCR/HTR) in the input image vary in width and the spacing. CTC enables the training engine to handle such a complexity without the need to align input images and ground truth.

II. DEFINITIONS

The term "input document object" may refer to a data object that describes a collection of text items using at least one of image data and character data (e.g., American Standard Code for Information Interchange (ASCII) data and/or Unicode data), where the collection is presented as an input to a trained convolutional neural document conversion machine learning model in order to generate conversion of the input document object into character form and perform prediction-based actions based on the generated conversion of the input document object. As noted above, the input document object may describe a scanned document or a scanned document that has been transformed into character data using a naïve OCR process. Examples of text items described by an input document object may include image representations of alphanumeric characters (e.g., alphanumeric characters A-Z and 0-9), image representations of selection indicators (e.g., checkbox markings), image representations of emojis, and/or the like.

The term "converted document object" may refer to a data object that contains a mapping of an input document object to an ordered character combination, where each ordered character combination is selected from a set of candidate characters, and where the set of candidate characters includes a set of alphanumeric characters and a set of selection indicator characters. A selection indicator character may describe whether a checkbox associated with a segment of characters has been selected or not. The converted document object may be generated by performing OCR or HTR as well as OMR on the input document object by utilizing the trained convolutional neural document conversion machine learning model.

The term "trained convolutional neural document conversion machine learning model" may refer to a data object that describes parameters and/or hyper-parameters of a machine learning model that is configured to apply a pattern of convolutional operations on an input document object (e.g., a stylistically augmented input document object) in order to generate a character-level conversion of the input document object. As described below, a trained convolutional neural document conversion machine learning model may be associated with a preprocessing block, a set of main processing blocks, and a set of postprocessing blocks, where the preprocessing block may have a uniform number of preprocessing subblocks, each main processing block in the set of main processing blocks may have a uniform number of main processing blocks, and each postprocessing block in the set of postprocessing blocks may have a uniform number of postprocessing blocks. A trained convolutional neural document conversion machine learning model may also have a Connectionist Temporal Classification (CTC) decoder that uses greedy decoding, as further described below.

The term "preprocessing block" may refer to a data object that describes a component of a trained convolutional neural document conversion machine learning model that performs a predefined number of convolutional operations on an input document object in order to generate a preprocessing output that is supplied to an initial main processing layer of the trained convolutional neural document conversion machine learning model, where the predefined number of convolutional operations of the preprocessing block may all have a uniform number of convolutional kernels. For example, a preprocessing block may be associated with two preprocessing subblocks, where each preprocessing subblock is configured to perform a one-dimensional convolution with size 3 kernels, 64 filters, a dilation of one, and a stride of two, followed by a batch normalization operation, followed by a rectified linear unit processing operation, and followed with a dropout operation with a dropout rate of 0.2. In some embodiments, each convolutional operation of the predefined number of convolutional operations that is performed by the preprocessing block is referred to as a preprocessing subblock of the preprocessing block, where a preprocessing block may be associated with a plurality of preprocessing subblocks, and where the count of the plurality of preprocessing subblocks is defined by the preprocessing subblock repetition count hyper-parameter. For example, in the above example where the preprocessing block is associated with two preprocessing subblocks, the preprocessing subblock repetition count hyper-parameter of the noted preprocessing block is two.

The term "main processing block" may refer to a data object that describes a component of a trained convolutional neural document conversion machine learning model that performs a predefined number of convolutional operations on the output of a preprocessing block of the trained convolutional neural document conversion machine learning model or the output of a preceding main processing block of the trained convolutional neural document conversion machine learning model, where the predefined number of convolutional operations performed by a particular main processing block may all have a uniform number of convolutional kernels, and where the main processing blocks of the trained convolutional neural document conversion machine learning model may all have a common number of the noted predefined convolutional operations. For example, a particular trained convolutional neural document conversion machine learning model may be associated with three main processing blocks, where each main processing block of the three main processing blocks is associated with three main processing subblocks, and where: (i) each of the three main processing subblocks of an initial main processing block of the three main processing subblocks is associated with a convolutional operation with size three kernels, 128 filters, a dilation of one, and a stride of one, followed by a batch normalization operation, followed by a rectified linear unit processing operation, followed by a dropout operation with a dropout rate of 0.2; (ii) each of the three main processing subblocks of a second main processing block of the three main processing subblocks is associated with a convolutional operation with size four kernels, 128 filters, a dilation of one, and a stride of one, followed by a batch normalization operation, followed by a rectified linear unit processing operation, followed by a dropout operation with a dropout rate of 0.3; and (iii) each of the three main processing subblocks of a final main processing block of the three main processing subblocks is associated with a convolutional operation with size six kernels, 128 filters, a dilation of one, and a stride of one, followed by a batch normalization operation, followed by a rectified linear unit processing operation, followed by a dropout operation with a dropout rate of 0.3. In some embodiments, the number of predefined operations of the main processing subblocks of a main processing subblock of a trained convolutional neural document conversion machine learning model are defined by a main processing subblock repetition count hyper-parameter of the trained convolutional neural document conversion machine learning model, while the number of main processing blocks of a trained convolutional neural document conversion machine learning model are defined by a main processing block count hyper-parameter of the trained convolutional neural document conversion machine learning model. For example, given the above-described the trained convolutional neural document conversion machine learning model that has three main processing blocks each having three main processing subblocks, both the main processing block count hyper-parameter of the trained convolutional neural document conversion machine learning model and the main processing subblock repetition count hyper-parameter of the trained convolutional neural document conversion machine learning model are three.

The term "postprocessing block" may refer to a data object that describes a component of a trained convolutional neural document conversion machine learning model that performs a predefined number of convolutional operations on the output of the main processing blocks of the trained convolutional neural document conversion machine learning model or the output of a preceding postprocessing block of the trained convolutional neural document conversion machine learning model, where the predefined number of convolutional operations performed by a postprocessing block may all have a uniform number of convolutional kernels, and where the postprocessing blocks of the trained convolutional neural document conversion machine learning model may all have a common number of predefined convolutional operations. For example, a particular trained convolutional neural document conversion machine learning model may be associated with three postprocessing blocks, where each postprocessing block of the three postprocessing blocks is associated with one postprocessing subblock, and where: (i) the postprocessing subblock of an initial postprocessing block of the three postprocessing subblocks is associated with a convolutional operation with size seven kernels, 256 filters, a dilation of two, and a stride of one, followed by a batch normalization operation, followed by a rectified linear unit processing operation, followed by a dropout operation with a dropout rate of 0.4; (ii) the postprocessing subblock of a second postprocessing block of the three postprocessing subblocks is associated with a convolutional operation with size one kernel, 512 filters, a dilation of one, and a stride of one, followed by a batch normalization operation, followed by a rectified linear unit processing operation, followed by a dropout operation with a dropout rate of 0.4; and (iii) the postprocessing subblock of a final postprocessing block of the three postprocessing subblocks is associated with a convolutional operation with size one kernel, a filter size equal to the number of candidate characters configured to be detected by the trained convolutional neural document conversion machine learning model, a dilation of one, and a stride of one, followed by a batch normalization operation, followed by a rectified linear unit processing operation, followed by a dropout operation with a dropout rate of 0. In some embodiments, the number of predefined operations of the postprocessing subblocks of a main processing subblock of a trained convolutional neural document conversion machine learning model are defined by a postprocessing subblock repetition count hyper-parameter of the trained convolutional neural document conversion machine learning model, while the number of postprocessing blocks of a trained convolutional neural document conversion machine learning model are defined by a postprocessing block count hyper-parameter of the trained convolutional neural document conversion machine learning model. For example, given the above-described the trained convolutional neural document conversion machine learning model that has three postprocessing blocks each having three postprocessing subblocks, the postprocessing block count hyper-parameter of the trained convolutional neural document conversion machine learning model is three while the postprocessing subblock repetition count hyper-parameter of the trained convolutional neural document conversion machine learning model is one.

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example architecture 100 for performing predictive data analysis. The architecture 100 includes a predictive data analysis system 101 configured to receive predictive data analysis requests from external computing entities 102, process the predictive data analysis requests to generate predictions, provide the generated predictions to the external computing entities 102, and automatically perform prediction-based actions based at least in part on the generated predictions. An example of a prediction that can be generated using the predictive data analysis system 101 is a prediction about conversion of an input document object into a converted document object.

In some embodiments, predictive data analysis system 101 may communicate with at least one of the external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more external computing entities 102, process the predictive data analysis requests to generate predictions corresponding to the predictive data analysis requests, provide the generated predictions to the external computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, RRAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive data analysis computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the predictive data analysis computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MIMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive data analysis computing entity 106 and/or various other computing entities.

In another embodiment, the external computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

Various embodiments of the present invention present innovative solutions for performing OCR/HTR/OMR that improve the computational efficiency and operational reliability of existing OCR/HTR/OMR models. Through their investigations, the inventors have recognized at least two sources contributing to the limited computational efficiency and the limited operational reliability of existing OCR/HTR/OMR models: limited availability of training data and computationally expensive use of language models. The innovative solutions provided herein include OCR/HTR/

OMR models that are trained using synthetically generated training data as well as greedy decoding to obviate the need for language models.

Provided below is exemplary architectures for a convolutional neural document conversion machine learning models as well as exemplary techniques for generating training data for various disclosed convolutional neural document conversion machine learning models. However, while various embodiments of the present invention disclose training the proposed convolutional neural document conversion machine learning models using the training data generation techniques disclosed herein and/or the training techniques discussed herein, a person of ordinary skill in the relevant technology will recognize that the proposed convolutional neural document conversion machine learning models may be trained using various other training data generation techniques and/or various other training techniques.

A. Convolutional Neural Document Conversion Machine Learning Models

FIG. 4 is a data flow diagram of an example process 400 for performing predictive document conversion using a trained convolutional neural document conversion machine learning model. Via the various steps/operations of the process 400, a predictive data analysis computing entity 106 can simultaneously perform OCR, HTR, and OMR in an effective and efficient manner by utilizing a custom-designed trained convolutional neural document conversion machine learning model.

The process 400 begins at step/operation 401 when a stylistic augmentation unit 452 of the predictive data analysis computing entity 106 receives an input document object from an input document dataset 451 of the storage subsystem 108. The input document object may be generated by scanning a real-world document, by performing OCR using a naïve OCR process on a scanned document, by receiving an input document from an external computing entity 102 such as an end-user client computing entity, and/or the like.

In general, the input document object may describe a collection of text items using at least one of image data and character data (e.g., American Standard Code for Information Interchange (ASCII) data and/or Unicode data), where the collection is presented as an input to a trained convolutional neural document conversion machine learning model in order to generate a conversion of the input document object into character form and perform prediction-based actions based on the generated conversion of the input document object. As noted above, the input document object may describe a scanned document or a scanned document that has been transformed into character data using a naïve OCR process. Examples of text items described by an input document object may include image representations of alphanumeric characters (e.g., alphanumeric characters A-Z and 0-9), image representations of selection indicators (e.g., checkbox markings), image representations of emojis, and/or the like.

The process 400 continues at step/operation 402 when a stylistic augmentation unit 452 performs one or more stylistic augmentations on the input document object in order to generate a stylistically augmented document object and provides the stylistically augmented document object to the trained convolutional neural document conversion machine learning model 453. One primary purpose of the augmentation tasks performed by the stylistic augmentation unit 452 may be to add/augment noise conditions affecting different document objects such as noise conditions associated with the manner of scanning real-world documents by imposing uniform stylistic conditions on the input document objects.

Accordingly, some examples of stylistic augmentations performed by the stylistic augmentation unit include noise (such as at least one of Gaussian noise, salt and pepper noise, fog, and speckle), line highlighting (such as at least one of underline highlighting, top-line highlighting, and box enclosing), object boundary padding (such as at least one of top object boundary padding, bottom object boundary padding, left object boundary padding, and right object boundary padding), random strokes (such as random stroke augmentation using at least one of erosion and dilation), and other stylistic augmentation operations such as at least one of rotation, shear modification, warping, and one or more perspective transformations.

The process 400 continues at step/operation 403 when the trained convolutional neural document conversion machine learning model 453 processes the stylistically augmented document object in order to generate a converted document object and provides the converted document object to a prediction-based action unit 454 of the predictive data analysis computing entity 106. Converted document objects as well as the operations associated with trained convolutional neural document conversion machine learning models are described in greater detail below.

In general, the converted document object may contain a mapping of an input document object to an ordered character combination, where each ordered character combination is selected from a set of candidate characters, and where the set of candidate characters includes a set of alphanumeric characters and a set of selection indicator characters. A selection indicator character may describe whether a checkbox associated with a segment of characters has been selected or not. The converted document object may be generated by performing OCR or HTR as well as OMR on the input document object by utilizing the trained convolutional neural document conversion machine learning model.

A trained convolutional neural document conversion machine learning model may be a machine learning model that is configured to apply a pattern of convolutional operations on an input document object (e.g., a stylistically augmented input document object) in order to generate a character-level conversion of the input document object. As described below, a trained convolutional neural document conversion machine learning model may be associated with a preprocessing block, a set of main processing blocks, and a set of postprocessing blocks, where the preprocessing block may have a uniform number of preprocessing subblocks, each main processing block in the set of main processing blocks may have a uniform number of main processing blocks, and each postprocessing block in the set of postprocessing blocks may have a uniform number of postprocessing blocks. A trained convolutional neural document conversion machine learning model may also have a Connectionist Temporal Classification (CTC) decoder that uses greedy decoding, as further described below.

A preprocessing block may be a component of a trained convolutional neural document conversion machine learning model that performs a predefined number of convolutional operations on an input document object in order to generate a preprocessing output that is supplied to an initial main processing layer of the trained convolutional neural document conversion machine learning model, where the predefined number of convolutional operations of the preprocessing block may all have a uniform number of convolutional kernels. For example, a preprocessing block may be associated with two preprocessing subblocks, where each preprocessing subblock is configured to perform a one-dimensional convolution with size three kernels, 64 filters, a dilation of one, and a stride of two, followed by a batch normalization operation, followed by a rectified linear unit processing operation, and followed with a dropout operation with a dropout rate of 0.2. In some embodiments, each convolutional operation of the predefined number of convolutional operations that is performed by the preprocessing block is referred to as a preprocessing subblock of the preprocessing block, where a preprocessing block may be associated with a plurality of preprocessing subblocks, and where the count of the plurality of preprocessing subblocks is defined by the preprocessing subblock repetition count hyper-parameter. For example, in the above example where the preprocessing block is associated with two preprocessing subblocks, the preprocessing subblock repetition count hyper-parameter of the noted preprocessing block is two.

A main processing block may be a component of a trained convolutional neural document conversion machine learning model that performs a predefined number of convolutional operations on the output of a preprocessing block of the trained convolutional neural document conversion machine learning model or the output of a preceding main processing block of the trained convolutional neural document conversion machine learning model, where the predefined number of convolutional operations performed by a particular main processing block may all have a uniform number of convolutional kernels, and where the main processing blocks of the trained convolutional neural document conversion machine learning model may all have a common number of predefined convolutional operations.

For example, a particular trained convolutional neural document conversion machine learning model may be associated with three main processing blocks, where each main processing block of the three main processing blocks is associated with three main processing subblocks, and where: (i) each of the three main processing subblocks of an initial main processing block of the three main processing subblocks is associated with a convolutional operation with size three kernels, 128 filters, a dilation of one, and a stride of one, followed by a batch normalization operation, followed by a rectified linear unit processing operation, followed by a dropout operation with a dropout rate of 0.2; (ii) each of the three main processing subblocks of a second main processing block of the three main processing subblocks is associated with a convolutional operation with size four kernels, 128 filters, a dilation of one, and a stride of one, followed by a batch normalization operation, followed by a rectified linear unit processing operation, followed by a dropout operation with a dropout rate of 0.3; and (iii) each of the three main processing subblocks of a final main processing block of the three main processing subblocks is associated with a convolutional operation with size six kernels, 128 filters, a dilation of one, and a stride of one, followed by a batch normalization operation, followed by a rectified linear unit processing operation, followed by a dropout operation with a dropout rate of 0.3.

In some embodiments, the number of predefined operations of the main processing subblocks of a main processing subblock of a trained convolutional neural document conversion machine learning model are defined by a main processing subblock repetition count hyper-parameter of the trained convolutional neural document conversion machine learning model, while the number of main processing blocks of a trained convolutional neural document conversion machine learning model are defined by a main processing block count hyper-parameter of the trained convolutional neural document conversion machine learning model. For example, given the above-described the trained convolutional neural document conversion machine learning model that has three main processing blocks each having three main processing subblocks, both the main processing block count hyper-parameter of the trained convolutional neural document conversion machine learning model and the main processing subblock repetition count hyper-parameter of the trained convolutional neural document conversion machine learning model are three.

A postprocessing block may be a component of a trained convolutional neural document conversion machine learning model that performs a predefined number of convolutional operations on the output of the main processing blocks of the trained convolutional neural document conversion machine learning model or the output of a preceding postprocessing block of the trained convolutional neural document conversion machine learning model, where the predefined number of convolutional operations performed by a postprocessing block may all have a uniform number of convolutional kernels, and where the postprocessing blocks of the trained convolutional neural document conversion machine learning model may all have a common number of predefined convolutional operations.

For example, a particular trained convolutional neural document conversion machine learning model may be associated with three postprocessing blocks, where each postprocessing block of the three postprocessing blocks is associated with one postprocessing subblock, and where: (i) the postprocessing subblock of an initial postprocessing block of the three postprocessing subblocks is associated with a convolutional operation with size seven kernels, 256 filters, a dilation of two, and a stride of one, followed by a batch normalization operation, followed by a rectified linear unit processing operation, followed by a dropout operation with a dropout rate of 0.4; (ii) the postprocessing subblock of a second postprocessing block of the three postprocessing subblocks is associated with a convolutional operation with size one kernel, 512 filters, a dilation of one, and a stride of one, followed by a batch normalization operation, followed by a rectified linear unit processing operation, followed by a dropout operation with a dropout rate of 0.4; and (iii) the postprocessing subblock of a final postprocessing block of the three postprocessing subblocks is associated with a convolutional operation with size one kernel, a filter size equal to the number of candidate characters configured to be detected by the trained convolutional neural document conversion machine learning model, a dilation of one, and a stride of one, followed by a batch normalization operation, followed by a rectified linear unit processing operation, followed by a dropout operation with a dropout rate of 0.

In some embodiments, the number of predefined operations of the postprocessing subblocks of a main processing subblock of a trained convolutional neural document conversion machine learning model are defined by a postprocessing subblock repetition count hyper-parameter of the trained convolutional neural document conversion machine learning model, while the number of postprocessing blocks of a trained convolutional neural document conversion machine learning model are defined by a postprocessing block count hyper-parameter of the trained convolutional neural document conversion machine learning model. For example, given the above-described the trained convolutional neural document conversion machine learning model that has three postprocessing blocks each having three postprocessing subblocks, the postprocessing block count hyper-parameter of the trained convolutional neural document conversion machine learning model is three while the postprocessing subblock repetition count hyper-parameter of the trained convolutional neural document conversion machine learning model is one.

An operational example of a trained convolutional neural document conversion machine learning model 500 is depicted in FIG. 5. As depicted in FIG. 5, the trained convolutional neural document conversion machine learning model 500 has one preprocessing block 501, three main processing blocks 502A-502C, three postprocessing blocks 503A-503C, a weighted CTC decoder 504, and a greedy CTC decoder. As described above, the preprocessing block 501 is configured to perform a predefined number of convolutional operations on an input document object in order to generate a preprocessing output and provide the generated preprocessing output to the three main processing blocks 502A-502C. The three main processing blocks 502A-502C may be configured to perform a predefined number of convolutional operations on the preprocessing output in order to generate a main processing output and provide the main processing output to the three postprocessing blocks 503A-503C. The three postprocessing blocks 503A-503C may be configured to perform a predefined number of convolutional operations on the main processing output in order to generate a postprocessing output and provide the postprocessing output to the three weighted CTC decoder 504.

Accordingly, each block depicted in the trained convolutional neural document conversion machine learning model 500 of FIG. 5 is configured to perform a predefined number of convolutional operations, also referred to herein as performing operations of a predefined number of subblocks. Thus, the preprocessing block 501 is configured to perform operations of a group of preprocessing subblocks, each of the three main processing blocks 502A-502C is configured to perform operations of a group of main processing subblocks, and each of the three postprocessing blocks 503A-503C is configured to perform operations of a group of main processing subblocks. In some embodiment, the convolutional operations performed by a subblock (i.e., the convolutional operations performed by a preprocessing subblock, the convolutional operations performed by a main processing subblock, or the convolutional operations performed by a postprocessing subblock) include a one-dimensional convolutional operation 601, a batch normalization operation 602, a rectified linear unit processing operation 603, and a dropout operation 604, as depicted in FIG. 6.

For example, in accordance with the trained convolutional neural document conversion machine learning model whose hyper-parameters are depicted in FIG. 7, an input document object is first processed by a preprocessing block having two preprocessing blocks, where each of the two preprocessing blocks is configured to perform a one-dimensional convolutional operation followed by a batch normalization operation, a rectified linear unit processing operation, and a dropout operation. As further depicted in FIG. 7, the one-dimensional convolutional operation performed by each preprocessing subblock of the preprocessing block has size three convolutional kernels, 64 filters, a dilation of one, and a stride of two. As further depicted in FIG. 7, the dropout operation performed by each preprocessing subblock of the preprocessing block has a dropout rate of 0.2.

As another example, in accordance with the trained convolutional neural document conversion machine learning model whose hyper-parameters are depicted in FIG. 7, the output of the processing block is processed by an initial main processing block having three main processing blocks (i.e., the same as the number of main processing subblocks of the two other main processing blocks of the trained convolutional neural document conversion machine learning model), where each of the three main processing blocks of the initial main processing block is configured to perform a one-dimensional convolutional operation followed by a batch normalization operation, a rectified linear unit processing operation, and a dropout operation. As further depicted in FIG. 7, the one-dimensional convolutional operation performed by each main processing subblock of the initial main processing block has size three convolutional kernels, 128 filters, a dilation of one, and a stride of one. As further depicted in FIG. 7, the dropout operation performed by each main processing subblock of the initial main processing block has a dropout rate of 0.2.

As an additional example, in accordance with the trained convolutional neural document conversion machine learning model whose hyper-parameters are depicted in FIG. 7, the output of the initial main processing block is processed by a second main processing block having three main processing blocks (i.e., the same as the number of main processing subblocks of the two other main processing blocks of the trained convolutional neural document conversion machine learning model), where each of the three main processing blocks of the second main processing block is configured to perform a one-dimensional convolutional operation followed by a batch normalization operation, a rectified linear unit processing operation, and a dropout operation. As further depicted in FIG. 7, the one-dimensional convolutional operation performed by each main processing subblock of the second main processing block has size four convolutional kernels, 128 filters, a dilation of one, and a stride of one. As further depicted in FIG. 7, the dropout operation performed by each main processing subblock of the second main processing block has a dropout rate of 0.3.

As a subsequent example, in accordance with the trained convolutional neural document conversion machine learning model whose hyper-parameters are depicted in FIG. 7, the output of the second main processing block is processed by a final main processing block having three main processing blocks (i.e., the same as the number of main processing subblocks of the two other main processing blocks of the trained convolutional neural document conversion machine learning model), where each of the three main processing blocks of the final main processing block is configured to perform a one-dimensional convolutional operation followed by a batch normalization operation, a rectified linear unit processing operation, and a dropout operation. As further depicted in FIG. 7, the one-dimensional convolutional operation performed by each main processing subblock of the final main processing block has size six convolutional kernels, 128 filters, a dilation of one, and a stride of one. As further depicted in FIG. 7, the dropout operation performed by each main processing subblock of the final main processing block has a dropout rate of 0.3.

As a further example, in accordance with the trained convolutional neural document conversion machine learning model whose hyper-parameters are depicted in FIG. 7, the output of the final main processing block is processing by an initial postprocessing block having one postprocessing block (i.e., the same as the number of postprocessing subblocks of the two other postprocessing blocks of the trained convolutional neural document conversion machine learning model), where the postprocessing subblock of the initial postprocessing block is configured to perform a one-dimensional convolutional operation followed by a batch normalization operation, a rectified linear unit processing operation, and a dropout operation. As further depicted in FIG. 7, the one-dimensional convolutional operation performed by the postprocessing subblock of the initial postprocessing block has size seven convolutional kernels, 256 filters, a dilation of two, and a stride of one. As further depicted in FIG. 7, the dropout operation performed by the postprocessing subblock of the initial postprocessing block has a dropout rate of 0.4.

As yet another example, in accordance with the trained convolutional neural document conversion machine learning model whose hyper-parameters are depicted in FIG. 7, the output of the initial postprocessing block is processed by a second postprocessing block having one postprocessing block (i.e., the same as the number of postprocessing subblocks of the two other postprocessing blocks of the trained convolutional neural document conversion machine learning model), where the postprocessing subblock of the second postprocessing block is configured to perform a one-dimensional convolutional operation followed by a batch normalization operation, a rectified linear unit processing operation, and a dropout operation. As further depicted in FIG. 7, the one-dimensional convolutional operation performed by the postprocessing subblock of the initial postprocessing block has size one convolutional kernel, 512 filters, a dilation of one, and a stride of one. As further depicted in FIG. 7, the dropout operation performed by the postprocessing subblock of the second postprocessing block has a dropout rate of 0.4.

As a further example, in accordance with the trained convolutional neural document conversion machine learning model whose hyper-parameters are depicted in FIG. 7, the output of the second postprocessing block is processed by a final postprocessing block having one postprocessing block (i.e., the same as the number of postprocessing subblocks of the two other postprocessing blocks of the trained convolutional neural document conversion machine learning model), where the postprocessing subblock of the final postprocessing block is configured to perform a one-dimensional convolutional operation followed by a batch normalization operation, a rectified linear unit processing operation, and a dropout operation. As further depicted in FIG. 7, the one-dimensional convolutional operation performed by the postprocessing subblock of the initial postprocessing block has size one convolutional kernel, a filter size equal to the number of candidate characters configured to be detected by the trained convolutional neural document conversion machine learning model (e.g., where the range of candidate characters may include all alphanumeric characters plus a set of selection indicator characters that include a character describing selection of a checkbox and a character describing lack of selection of a checkbox), a dilation of one, and a stride of one. As further depicted in FIG. 7, the dropout operation performed by the postprocessing subblock of the second postprocessing block has a dropout rate of zero.

Returning to FIG. 5, the weighted CTC decoder 504 is configured to perform CTC weighted decoding on the output of the final postprocessing block in order to minimize a negative log probability of given output Y given an input X, i.e., to minimize $-\Sigma_{(X,Y)\in D}$ log p(Y|X), where D is the training data set D={X, Y}. Performing this minimization may be performed by merging consecutive repeating characters delimited by E, which is a character denoting free space in a document. For example, an output sequence 1ϵbbϵϵa may map to 1ba. To obtain such an input, the weighted CTC encoder 504 may utilize a function τ which may squeeze repeating characters to a single character and remove blank spaces (i.e., occurrences of the character ϵ). This in turn implies the probability equations $p(y|X)=\Sigma_{\tau(\pi)=y}$ log p(π|X) and $p(\pi|X)=\Pi_{t=1}^{T} y_{\pi_t}^{t}$, where $y_{\pi_t}^{t}$ is the probability of generating the label $\pi_t$ at time t. Thus, the predicted label y for an input X may be obtained using $y=\tau(\text{argmax}_\pi p(\pi|X))$. In some embodiments, the operations of the weighted CTC decoder 504 may be performed in accordance with the equation $\text{ClassWeightedCTC}(y|X)=-\Sigma_t\Sigma_k a_k y_k^t \log y_k^t$, where $y_{\pi_t}^{t}$ is the probability of generating the label k at time t, and where $a_k$ is determined using the below equation:

$$\alpha_k = \begin{cases} 1-\alpha & \text{if } k=\epsilon \\ \alpha & \text{otherwise} \end{cases} \quad \text{Equation 1}$$

In some embodiments, operations of the above-described ClassWeightedCTC(y|X) function is performed in accordance with the techniques discussed in Li and Wang, A Novel Re-weighting Method for Connectionist Temporal Classification, available online at https://arxiv.org/abs/1904.10619.

The greedy decoder 505 may be configured to generate the converted document object based on the output of the weighted CTC decoding and by using a greedy optimization technique. In some embodiments, the greedy decoder 505 is used instead of a language model, for at least two primary reasons: Firstly, training a language model requires additional time and data volume which is not always available. Secondly, the usage of language model slows down the inference pipeline in practice.

Returning to FIG. 4, at step/operation 403, a prediction action unit 454 of the predictive data analysis computing entity 106 performs one or more prediction-based actions based on the converted document object. For example, the prediction action unit 454 may store the converted document object in the storage subsystem 108. As another example, the prediction action unit 454 may provide a user interface that displays the contents of the converted document object. As yet another example, the prediction action unit 454 may process the converted document object using a secondary machine learning model in order to generate one or more predictive inferences and use the one or more predictive inferences in order to perform one or more prediction-based actions (e.g., in order to display the one or more predictive inferences using a prediction output user interface, in order to generate one or more end-user notifications based on the predictive inferences, in order to perform one or more operational load balancing operations based on the predictive inferences, and/or the like).

In some embodiments, the prediction-based action performed by the prediction action unit includes generating an OCR/HTR/OMR output user interfaces that may be displayed on an external computing entity 102 and/or on the predictive data analysis computing entity 106. Examples of suitable components of the noted OCR/HTR/OMR output user interfaces are depicted in FIGS. 16A and 16 B.

B. Training Data Generation

In some embodiments, the trained convolutional neural document conversion machine learning model may be trained using training data that is generated in accordance with the process 800 depicted in FIG. 8. As depicted in FIG. 8, as part of the process 800, a configurable data generator unit 851 of the predictive data analysis computing entity 106 uses a set of data patterns 852, a set of style patterns 853, and a set of checkbox markings 854. The set of data patterns 852 may include machine printed text patterns and/or handwritten text patterns (e.g., addresses, phone numbers, sentences, and/or the like) each associated with a ground-truth character-level conversion. The set of style patterns 853 may include different combinations of font styles, font sizes, formatting styles, stroke styles, and/or the like. The set of checkbox markings 854 may include a category of checkboxes deemed to be marked as well as a category of checkboxes deemed to be unmarked.

For example, as depicted in FIG. 9, the set of checkbox markings 854 includes a category of marked checkboxes 911 and a category of unmarked checkboxes 912. In some embodiments, to generate the set of checkbox markings 854, the predictive data analysis computing entity 106 first uses an OCR solution (e.g., the OCR solution provided by the trained convolutional neural document conversion machine learning model described above) to transcribe a text document, then performs keyword matchings to identify predefined checkbox-related text segments (for example, see FIG. 10), then crops a small portion to the left of each predefined checkbox-related text segment as a checkbox (for example, see FIG. 11), and then uses a trained convolutional classifier to determine whether each cropped checkbox is marked or not marked based on the white pixel density of the cropped checkbox.

Returning to FIG. 8, the configurable data generator unit 851 generates initial training data based on the set of data patterns 852, the set of style patterns 853, and the set of checkbox markings 854. In some embodiments, generating initial training data may be performed in accordance with the process depicted in FIG. 12. The process depicted in FIG. 12 begins at step/operation 1201 when the configurable data generator unit uses a machine printed text subset of the set of data patterns 852 and the set of style patterns 853 in accordance with a set of probabilistic synthetic text data generators to generate a set of machine printed text data objects that comprise the noted machine printed text subset set of data patterns 852 and a newly generated set of synthetically generated machine printed text data objects. An operational example of performing the step/operation 1202 is depicted in FIG. 13. As depicted in FIG. 13, the configurable data generator unit 851 uses the set of data patterns 852 and the set of style patterns 853 to generate a set of synthetically generated machine printed text data objects 1301. Operational examples of various synthetically generated machine printed text data objects 1301 are depicted in FIG. 14.

At step/operation 1202, the configurable data generator unit 851 uses a handwritten text subset of the set of data patterns 852 to generate a set of handwritten text data objects that comprise handwritten text subset of the set of data patterns 852 and a set of synthetically generated handwritten text data objects. To generate the synthetically generated handwritten text data objects, the configurable data generator unit 851 may use a machine learning model, such as a machine learning model trained using the IAM handwritten text dataset, synthetically generated handwritten text data that is generated using the techniques disclosed in Graves, Generating Sequences With Recurrent Neural Networks, available at https://arxiv.org/abs/1308.0850, and manually generated handwritten text data. Operational examples of various synthetically generated handwritten text data objects are depicted in FIG. 15.

At step/operation 1203, the configurable data generator unit 851 combines the set of checkbox markings 854 with at least one of the set of machine printed text data objects and/or the set of handwritten text data objects in order to generate the initial text data. For example, the configurable data generator unit 851 selects a ratio (e.g., five percent) of a repository of text data objects (e.g., a repository including at least one of the set of machine printed text data objects and/or the set of handwritten text data objects) and affixes each selected text data objects to a randomly selected checkbox marking from a randomly selected checkbox marking category. After during the noted affixation, the predictive data analysis computing entity 106 may proceed to perform a particular resizing at least one of the affixed text data object or the affixed checkbox marking in order to generate an affixed data object that will be included among the initial training data.

Returning to FIG. 8, an image augmentation unit 855 of the predictive data analysis computing entity 106 performs a set of image augmentations on the initial training data in order to generate the final training data and store the final training data in a training datastore 856. One primary purpose of the augmentation tasks performed by the image augmentation unit 855 may be to reduce noise conditions affecting different document objects such as noise conditions associated with the manner of scanning real-world documents by improving uniform stylistic conditions on the input document objects. Examples of stylistic augmentations performed by the stylistic augmentation unit include noise (such as at least one of Gaussian noise, salt and pepper noise, fog, and speckle), line highlighting (such as at least one of underline highlighting, top-line highlighting, and box enclosing), object boundary padding (such as at least one of top object boundary padding, bottom object boundary padding, left object boundary padding, and right object boundary padding), random strokes (such as random stroke augmentation using at least one of erosion and dilation), and other stylistic augmentation operations such as at least one of rotation, shear modification, warping, and one or more perspective transformations.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:

identifying, by one or more processors, an input document object;

processing, by the one or more processors, the input document object using a trained convolutional neural document conversion machine learning model to generate a converted document object, wherein:

(i) the trained convolutional neural document conversion machine learning model is configured to map the input document object to an ordered character combination, (ii) the ordered character combination is determined based on a set of candidate characters, (iii) the set of candidate characters include a set of alphanumeric characters and a set of selection indicator characters, (iv) the trained convolutional neural document conversion machine learning model is associated with a preprocessing block having a plurality of preprocessing subblocks, one or more main processing blocks each having a plurality of main processing sub-blocks, and a plurality of postprocessing blocks each having one or more postprocessing subblocks, and (v) the trained convolutional neural document conversion machine learning model is associated with a preprocessing subblock repetition count hyper-parameter that defines a preprocessing subblock count of the plurality of preprocessing subblocks; and initiating, by the one or more processors, the performance of one or more prediction-based actions based on the converted document object.

2. The computer-implemented method of claim 1, wherein the trained convolutional neural document conversion machine learning model is associated with a main processing subblock repetition count hyper-parameter defining a main processing subblock count of each plurality of main processing subblocks for a main processing block of the one or more main processing blocks.

3. The computer-implemented method of claim 2, wherein the main processing subblock repetition count hyper-parameter is three.

4. The computer-implemented method of claim 1, wherein the preprocessing subblock repetition count hyper-parameter is two.

5. The computer-implemented method of claim 1, wherein the trained convolutional neural document conversion machine learning model is associated with a postprocessing subblock repetition count hyper-parameter defining a postprocessing subblock count of each one or more postprocessing sub blocks for a postprocessing block of the plurality of postprocessing blocks.

6. The computer-implemented method of claim 5, wherein the postprocessing subblock repetition count hyper-parameter is one.

7. The computer-implemented method of claim 1, wherein the trained convolutional neural document conversion machine learning model is associated with a main processing block count hyper-parameter defining a main processing block count of the one or more main processing blocks.

8. The computer-implemented method of claim 7, wherein the main processing block count hyper-parameter is three.

9. The computer-implemented method of claim 1, wherein the trained convolutional neural document conversion machine learning model is associated with a postprocessing block count hyper-parameter defining a postprocessing block count of the plurality of postprocessing blocks.

10. The computer-implemented method of claim 9, wherein the postprocessing block count hyper-parameter is three.

11. The computer-implemented method of claim 1, wherein generating the trained convolutional neural document conversion machine learning model comprises:

generating a set of machine printed text data objects, wherein the set of machine printed text data objects comprise a set of synthetic machine printed text data objects;

generating a set of handwritten text data objects, wherein the set of machine printed text data objects comprise a set of synthetic handwritten text data objects;

generating a set of selection indicator text data objects;

generating an augmented training dataset based on the set of machine printed text data objects, the set of handwritten text data objects, and the set of selection indicator text data objects; and generating the trained convolutional neural document conversion machine learning model based on the augmented training dataset.

12. A computing system comprising one or more processors and memory including program code, the memory and the program code configured to, with the one or more processors, cause the computing system to at least:

identify an input document object;

process the input document object using a trained convolutional neural document conversion machine learning model to generate a converted document object, wherein:

(i) the trained convolutional neural document conversion machine learning model is configured to map the input document object to an ordered character combination, (ii) the ordered character combination is determined based on a set of candidate characters, (iii) the set of candidate characters include a set of alphanumeric characters and a set of selection indicator characters, (iv) the trained convolutional neural document conversion machine learning model is associated with a preprocessing block having a plurality of preprocessing subblocks, one or more main processing blocks each having a plurality of main processing sub-blocks, and a plurality of postprocessing blocks each having one or more postprocessing subblocks, and (v) the trained convolutional neural document conversion machine learning model is associated with a preprocessing subblock repetition count hyper-parameter that defines a preprocessing subblock count of the plurality of preprocessing subblocks; and initiate the performance of one or more prediction-based actions based on the converted document object.

13. The computing system of claim 12, wherein the trained convolutional neural document conversion machine learning model is associated with a main processing sub-block repetition count hyper-parameter defining a main processing subblock count of each plurality of main processing subblocks for a main processing block of the one or more main processing blocks.

14. The computing system of claim 13, wherein the main processing subblock repetition count hyper-parameter is three.

15. The computing system of claim 12, wherein the preprocessing subblock repetition count hyper-parameter is two.

16. The computing system of claim 12, wherein the trained convolutional neural document conversion machine learning model is associated with a postprocessing subblock repetition count hyper-parameter defining a postprocessing subblock count of each one or more postprocessing sub-blocks for a postprocessing block of the plurality of post-processing blocks.

17. The computing system of claim 12, wherein generating the trained convolutional neural document conversion machine learning model comprises:

generating a set of machine printed text data objects, wherein the set of machine printed text data objects comprise a set of synthetic machine printed text data objects;

generating a set of handwritten text data objects, wherein the set of machine printed text data objects comprise a set of synthetic handwritten text data objects;

generating a set of selection indicator text data objects;

generating an augmented training dataset based on the set of machine printed text data objects, the set of handwritten text data objects, and the set of selection indicator text data objects; and generating the trained convolutional neural document conversion machine learning model based on the augmented training dataset.

18. A computer program product comprising at least one non-transitory computer-readable storage medium having computer-readable program code portions stored therein, the computer-readable program code portions configured to:

identify an input document object;

process the input document object using a trained convolutional neural document conversion machine learning model to generate a converted document object, wherein:

(i) the trained convolutional neural document conversion machine learning model is configured to map the input document object to an ordered character combination, (ii) the ordered character combination is determined based on a set of candidate characters, (iii) the set of candidate characters include a set of alphanumeric characters and a set of selection indicator characters, (iv) the trained convolutional neural document conversion machine learning model is associated with a preprocessing block having a plurality of preprocessing sub blocks, one or more main processing blocks each having a plurality of main processing sub blocks, and a plurality of postprocessing blocks each having one or more postprocessing subblocks, and (v) the trained convolutional neural document conversion machine learning model is associated with a preprocessing subblock repetition count hyper-parameter that defines a preprocessing subblock count of the plurality of preprocessing sub blocks; and initiate the performance of one or more prediction-based actions based on the converted document object.

19. The computer program product of claim 18, wherein generating the trained convolutional neural document conversion machine learning model comprises:

generating a set of machine printed text data objects, wherein the set of machine printed text data objects comprise a set of synthetic machine printed text data objects;

generating a set of handwritten text data objects, wherein the set of machine printed text data objects comprise a set of synthetic handwritten text data objects;

generating a set of selection indicator text data objects;

generating an augmented training dataset based on the set of machine printed text data objects, the set of handwritten text data objects, and the set of selection indicator text data objects; and generating the trained convolutional neural document conversion machine learning model based on the augmented training dataset.

20. The computer program product of claim 18, wherein the trained convolutional neural document conversion machine learning model is associated with a main processing subblock repetition count hyper-parameter defining a main processing subblock count of each plurality of main processing subblocks for a main processing block of the one or more main processing blocks.

* * * * *

UNITED STATES PATENT AND TRADEMARK OFFICE

CERTIFICATE OF CORRECTION

PATENT NO. : 12,046,064 B2
APPLICATION NO. : 16/999221
DATED : July 23, 2024
INVENTOR(S) : Kartik Chaudhary et al.

It is certified that error appears in the above-identified patent and that said Letters Patent is hereby corrected as shown below:

In the Claims

In Column 27, Line 31, Claim 5, delete "sub blocks" and insert -- subblocks --, therefor.

In Column 29, Line 30, Claim 18, delete "sub blocks," and insert -- subblocks, --, therefor.

In Column 29, Lines 31-32, Claim 18, delete "sub blocks," and insert -- subblocks, --, therefor.

In Column 30, Line 5, Claim 18, delete "sub blocks;" and insert -- subblocks; --, therefor.

Signed and Sealed this
Twenty-sixth Day of November, 2024

Katherine Kelly Vidal

Katherine Kelly Vidal
*Director of the United States Patent and Trademark Office*